(12) United States Patent
Hayakawa

(10) Patent No.: US 6,307,720 B1
(45) Date of Patent: Oct. 23, 2001

(54) THIN FILM MAGNETIC HEAD

(75) Inventor: Yasuo Hayakawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/298,634

(22) Filed: Apr. 23, 1999

(30) Foreign Application Priority Data

Apr. 24, 1998 (JP) .................................................. 10-114962
Apr. 30, 1998 (JP) .................................................. 10-121425
Feb. 16, 1999 (JP) .................................................. 11-037867

(51) Int. Cl.$^7$ .................................................. G11B 5/127
(52) U.S. Cl. ........................................... 360/313; 360/126
(58) Field of Search .................................... 360/313, 123, 360/126

(56) References Cited

U.S. PATENT DOCUMENTS 5,644,455  7/1997  Schultz .

FOREIGN PATENT DOCUMENTS

| 2-134740 | 5/1990 | (JP) . |
| 5-205224 | 8/1993 | (JP) . |
| 6-274830 | 9/1994 | (JP) . |
| 8-67980  | 3/1996 | (JP) . |

Primary Examiner—Allen Cao
(74) Attorney, Agent, or Firm—Brinks Hofer Gilson & Lione

(57) ABSTRACT

In the formation of an AlN film as a gap layer of a thin film magnetic head, the mean crystal grain size of the AlN film can be regulated in the range from 85 angstroms to 130 angstroms to improve the denseness of the film, by connecting a radio frequency power source also to a substrate-supporting unit and supplying bias power of 17 W to 40 W to the substrate-supporting unit. The AlN film can have, therefore, improved head dissipation, corrosion resistance against an alkali solution, higher hardness, higher surface resistance and lower surface roughness. There is also disclosed a thin film magnetic head comprising at least a magnetoresistive element layer formed on a lower shield layer with the interposition of a lower gap layer, a lead layer for imparting a sensing current to the magnetoresistive element layer, and an upper shield layer formed on the lead layer with the interposition of an upper gap layer, in which at least either of the lower and upper gap layers has an Al—N—X system insulating layer, the element X being at least one element selected from Si, B, Cr, Ti, Ta and Nb.

18 Claims, 16 Drawing Sheets

THIN FILM MAGNETIC HEAD

BACKGROUND OF THE INVENTION

1. Field of the Invention

The present invention relates to thin film magnetic heads provided with a magnetoresistive element and to production processes of the same.

2. Description of the Related Art

Current thin film magnetic heads provided with a magnetoresistive element (MR element) can be classified into anisotropic magnetoresistive (AMR) heads utilizing the anisotropic magnetoresistive effect and giant magnetoresistive (GMR) heads utilizing spin-dependent scattering of the conduction electrons. As an example of such GMR heads, U.S. Pat. No. 5,159,513 discloses a spin valve head having a high magnetoresistive effect in a weak external magnetic field.

FIG. 21 illustrates a schematic configuration is a conventional AMR head. The conventional AMR head comprised of a lower shield layer 7 composed of a magnetic alloy such as sendust (Fe—Al—Si) and a lower gap layer 8 formed on the lower shield layer 7. Onto the lower gap layer 8 is laminated an AMR element layer 10. The AMR layer 10 is comprised of a soft magnetic layer 11, a nonmagnetic conductive layer 12 formed on the layer 11, and a ferromagnetic layer (AMR material layer) 13 formed on the layer 12. On both sides of the AMR element layer 10 are formed permanent magnet layers 15, and lead layers 16 in this order.

Onto these layers are formed an upper gap layer 18 and a upper shield layer 19 in this order.

For optimum operations of such an AMR head, two bias magnetic fields are required to apply to the ferromagnetic layer 13 which exhibits the AMR effect.

A first bias magnetic field is to ensure resistance changes of the ferromagnetic layer 13 to respond linearly to a magnetic flux from a magnetic medium. The first bias magnetic field is applied in perpendicular direction (Z direction in FIG. 21) to the film plane of the magnetic medium and in parallel with the plane of the ferromagnetic layer 13. The first bias magnetic filed is generally called as "lateral bias", where a sensing current is passed from the lead layer 16 to the AMR element layer 10 to produce a current magnetic field and thereby to magnetize the soft magnetic layer 11 in the Z direction, and a lateral bias is thus applied onto the ferromagnetic layer 13 in the Z direction by the magnetization of the soft magnetic filed.

The second bias magnetic filed is generally called as "longitudinal bias", which is applied in parallel with the planes of the magnetic medium and the ferromagnetic layer 13 (X direction in FIG. 21). The longitudinal bias magnetic field is to reduce Barkhausen noises generated by a plenty of magnetic domains formed in the ferromagnetic layer 13, in other words, to smooth resistance changes from the magnetic medium to this magnetic flux with less noises.

Reduction of the Barkhausen noises requires the ferromagnetic layer 13 to be put into a single magnetic domain state. Methods of applying longitudinal bias to this end generally include two techniques, i.e., a technique of providing the permanent magnet layers 15, 15 on both sides of the ferromagnetic layer 13 to utilize a leakage flux from the permanent magnet layers 15; and another technique of utilizing an exchange anisotropic magnetic field generated on a contact boundary surface between an antiferromagnetic layer and a ferromagnetic layer.

As a structure of GMR heads utilizing the exchange coupling by an antiferromagnetic layer is known a spin-valve type head illustrated in FIG. 22.

The GMR head illustrated in FIG. 22 differs from the AMR head illustrated in FIG. 21 in that the former comprises a GMR element layer 20 instead of the AMR element layer 10.

The GMR element layer is comprised of a free magnetic layer 22, a nonmagnetic conductive intermediate layer 23, a pinned magnetic layer 24 and an antiferromagnetic layer 25.

In the configuration shown in FIG. 22, bias in the track direction (X direction in FIG. 22) should be applied onto the free magnetic layer 22 by the permanent magnet layers 15, 15 to ensure that the free magnetic layer 22 has the magnetization oriented in the track direction in a single magnetic domain state, and the pinned magnetic layer 24 should have the magnetization oriented in the Z direction in FIG. 22, in a single magnetic domain state by applying bias in the Z direction, i.e., the direction perpendicular to the magnetization of the free magnetic layer 22. In other words, the magnetization of the pinned magnetic layer 24 should not be changed by a flux from a magnetic medium (in the Z direction in FIG. 22), and the magnetization of the free magnetic layer 22 should rotate in the range of 90±θ° with respect to the magnetization of the pinned magnetic layer 24 to give linear responsivity of the magnetoresistive effect.

A comparatively large bias magnetic field is required to fix the magnetization of the pinned magnetic layer 24 in the Z direction in FIG. 22, and the larger is this bias magnetic field, the better is the fixation done. At least a 100-Oe bias magnetic field is required to overcome an antimagnetic field in the Z direction in FIG. 22 and to inhibit the magnetization from rotating or fluctuating by a flux from a magnetic medium. To obtain the bias magnetic field, the configuration illustrated in FIG. 22 utilizes an exchange anisotropic magnetic field generated by providing the antiferromagnetic layer 25 in contact with the pinned magnetic layer 24.

In such a configuration as shown in FIG. 22, the exchange coupling formed by providing the antiferromagnetic layer 25 in contact with the pinned magnetic layer 24 allows the pinned magnetic layer 24 to have the magnetization oriented and fixed in the Z direction. When a leakage magnetic field from a magnetic medium transferring in the Y direction is applied, the electrical resistance of the GMR element layer 20 changes with changes of the magnetization of the free magnetic layer 22, and hence the leakage magnetic field of the magnetic medium can be detected through the electrical resistance changes.

The bias applied to the free magnetic layer 22 is to ensure the linear responsivity and to reduce Barkhausen noises generated due to the formation of a number of magnetic domains, and applied in a similar manner in the longitudinal bias in the AMR head. In the configuration shown in FIG. 22, permanent magnet layers 15, 15 are provided on both sides of the free magnetic layer 22 and a leakage flux from the permanent magnet layers 15, 15 is used as the bias.

During operation of such a thin film magnetic head, the vicinity of an MR element layer such as an AMR element layer or a GMR element layer is known to rise in temperature readily up to about 120° C. due to heat generated through a stationary sensing current. At such a high temperature, the electrical resistance of a ferromagnetic layer changes due to a high sensitivity of the MR element to temperature changes, and hence the reading signals are disturbed. In the GMR elements, the exchange anisotropic magnetic field by the antiferromagnetic layer 25 composed of, for example, FeMn is highly sensitive to changes in temperature, and decreases almost linearly with respect to the temperature and disappears at about 150° C. (blocking temperature: Tb), so that a stable exchange anisotropic magnetic field cannot be obtained.

To solve these problems, conventional thin film magnetic heads provide upper and lower gap layers 8, 18 made of aluminium oxide ($Al_2O_3$) with respect to the AMR element layer 10 or the GMR element layer 20 to dissipate the heat gradually through the gap layers 8, 18 to the shield layers 7, 19 to thereby dissipate it to outside.

Demands have been made to enhance the output of thin film magnetic heads, and to this end, a stationary sensing current density applied to the MR element layer should be increased by making the thickness or depth of the MR element thinner.

In conventional thin film magnetic heads, however, when a stationary sensing current density is increased, the heat generated through the stationary sensing current cannot sufficiently be dissipated from the gap layers 8, 18 made of aluminium oxide ($Al_2O_3$). The MR element layer is, therefore, deteriorated or cracked or elements in the constitutive layers of the MR element layer transfer therebetween to disturb compositions of the constitutive components of individual layers and thereby to deteriorate the linear responsivity or reduce the suppressing effect of Barkhausen noises. Accordingly, the output cannot be enhanced by simple miniaturization of the MR element or improvement of the current density by means of an increasing stationary sensing current.

This is because the gap layers 8, 18 formed upper and lower sides of the AMR element layer 10 or the GMR element layer 20 are fabricated of an insulation film having a low thermal conductivity such as $Al_2O_3$.

TABLE 1

| Material | Thermal conductivity (W/mK) |
| --- | --- |
| $Al_2O_3$ | 30 |
| $SiO_2$ | 1.4 |
| AlN | 260 |
| SiC | 100 |
| C (Diamond) | 660 |
| BN | 57 |
| Mgo | 40 |
| SiAlON | 33 |
| $Si_3N_4$ | 37 |

Table 1 demonstrates thermal conductivity of major insulating materials as bulks.

As evident from Table 1, AlN and other insulating materials have higher thermal conductivity than $Al_2O_3$ and $SiO_2$ which have been conventionally used as the gap layers 8, 18.

Among these materials, AlN is the most preferable insulating material as the gap layers 8, 18 for its high crystallinity and high thermal conductivity.

The present inventors made intensive investigations and experiments on materials of the gap layers, and assumed that the use of aluminium nitride (AlN) having a higher thermal conductivity than aluminium oxide ($Al_2O_3$) conventionally used can dissipate the heat generated through a stationary sensing current with a high efficiency.

Such an MR head is produced by a photolithography process comprising photoresist application, exposure, development with a strong alkali solution and rinsing with water. The aluminium nitride (AlN) when constituting the gap layers is highly dissolved in a strong alkali solution which may possibly invite short circuit upon passing of a sensing current is passed. An aluminium nitride film, which readily reacts with water and forms a compound to be dissolved, is readily dissolved in the rinsing process of the manufacture of the MR head or by moisture in air after its manufacture. The reliability of such a head is hence deteriorated.

AlN films used as the gap layers 8, 18 are formed by sputtering or vapor deposition.

As sputtering apparatus are used known apparatus such as an RF sputtering apparatus or a magnetron sputtering apparatus.

According to these sputtering apparatus, a substrate and a target opposed to each other, and the target is mounted on an electrode unit. By applying radio frequencies to the electrode unit from a radio frequency electric source (RF electric source), the target is sputtered to thereby form an AlN film on the substrate.

When power is supplied only to the target upon sputtering as in this sputtering apparatus, however, the AlN film formed on the substrate may readily have pinholes, and its thermal conductivity to serve as the gap layers 8, 18 is decreased its corrosion resistance against an alkali aqueous solution is deteriorated.

The gap layers 8, 18 should be insoluble in an alkali aqueous solution as the alkali aqueous solution is used as a developer in the resist patterning.

SUMMARY OF THE INVENTION

Accordingly, it is a primary object of the invention to provide a thin film magnetic head, which can dissipate heat generated through a stationary sensing current with a high efficiency so as to suppress thermal diffusion, burning, output decrease and deterioration of the exchange anisotropic magnetic field due to the temperature increase of the MR element layer and which has a satisfactory linear responsivity and less Barkhausen noises, and a process for producing the same.

It is a secondary object of the invention to provide a thin film magnetic head, which is comprised of AlN films as the gap layers formed upper and lower sides of a magnetoresistive element layer, in which the AlN films have a higher thermal conductivity and an improved corrosion resistance against alkali aqueous solutions and other improved characteristics, and a sputtering process for producing the thin film magnetic head.

The invention provides, in a first aspect, a thin film magnetic head being composed of at least a lower shield layer, a lower gap layer formed on the lower shield layer, a magnetoresistive element layer formed on the lower gap layer, a lead layer for imparting a sensing current to the magnetoresistive element layer, an upper gap layer formed on the lead layer, and an upper shield layer formed on the upper gap layer, wherein at least either of the lower gap layer and upper gap layer is comprised an AlN film and wherein the AlN film has a mean crystal grain size ranging from 85 angstroms to 130 angstroms.

The mean crystal grain size preferably ranges from 95 angstroms to 130 angstroms.

The invention provides, in a second aspect, a thin film magnetic head being composed of at least a lower shield layer, a lower gap layer formed on the lower shield layer, a magnetoresistive element layer formed on the lower gap layer, a lead layer for imparting a sensing current to the magnetoresistive element layer, an upper gap layer formed on the lead layer, and an upper shield layer formed on the upper gap layer, wherein at least either of the lower gap layer and upper gap layer is comprised an AlN film and wherein the AlN film has a lattice parameter ranging from 2.67 angstroms to 2.7 angstroms.

The lattice parameter above preferably ranges from 2.68 angstroms to 2.7 angstroms.

According to the invention, the (002) plane of a crystalline layer of the AlN film may be in preferred orientation in the direction perpendicular to the plane of the film.

The invention further provides a sputtering process for forming an AlN film of the aforementioned thin film magnetic head in which a target and a substrate opposed to the target are disposed in a film-forming apparatus, wherein bias power is supplied both to the target side and the substrate side, and wherein the bias power supplied to the substrate side is lower than the bias power supplied to the target side.

In this case, the bias power supplied to the substrate side may preferably range from 17 W to 40 W and more preferably from 17 W to 30 W.

The use of an AlN film having a higher thermal conductivity than conventional $Al_2O_3$ films and other insulation films used as gap layers in a thin film magnetic head can reduce temperature increase of the element in a magnetoresistive element layer of the thin film magnetic head, and is desirable.

AlN films formed by the sputtering process, however, readily have pinholes to deteriorate its corrosion resistance against alkali aqueous solutions and thermal conductivity.

The present inventors found that various characteristics of such an AlN films can be improved by allowing bias power to supply to a substrate side as well as a target side in a sputtering apparatus and reverse-sputtering the surface of the AlN film formed on the substrate by this bias power.

It is presumed that the reverse-sputtering improves the denseness of the formed AlN film.

An excessively large reverse-sputtering by the function of increasing bias power, however, is not preferred as it decreases forming rate of and increases the surface roughness Ra of the AlN film.

According to the invention, therefore, the bias power supplied to the substrate side (hereinafter briefly be referred to as "the bias power") may preferably range from 17 W to 40 W and more preferably from 17 W to 30 W.

The use of the bias power ranging from 17 W to 40 W ensures the AlN film to have a mean crystal grain size of 85 angstroms to 130 angstroms, which is less than those formed without supplying the bias power.

In this case, the AlN film may have a lattice parameter ranging from 2.67 angstroms to 2.7 angstroms, which is less than those formed without supplying the bias power.

The use of the bias power ranging from 17 W to 30 W may ensure the AlN film to have a mean crystal grain size ranging from 95 angstroms to 130 angstroms and a lattice parameter ranging from 2.68 angstroms to 2.7 angstroms.

By reducing the mean crystal grain size or lattice parameter of the AlN film as thus described, the denseness of the film can be increased and the formation of pinholes or other defects can be minimized.

By regulating the mean crystal grain size or lattice parameter of the AlN film within the above specified range, the AlN film can have an increased heat dissipating property and corrosion resistance against alkali aqueous solutions, a higher hardness, a larger surface resistance and a less surface roughness Ra.

Such an AlN film has a high membrane stress and will possibly be delaminated on or after the formation of an MR head.

The present inventors further made intensive investigations to solve this problem, and found that gap layers can be obtained, which have a higher thermal conductivity than aluminium oxide and a less solubility in a strong alkali solution and in water and has a lower membrane stress than those formed of aluminium nitride, by adding at least one element X selected from the group consisting of Si, B, Cr, Ti, Ta and Nb, to an insulating layer comprised Al and N to give an Al—N—X insulating layer and forming the gap layers from the insulating layer, or by allowing the gap layers to contained an Al—N—X insulating layer. The above element X are readily combined with N and have a high corrosion resistance against a strong alkali solution and water. The invention has been accomplished based upon the above findings.

Accordingly, the invention provides, in a third aspect, a thin film magnetic head being composed of at least a lower shield layer, a lower gap layer formed on the lower shield layer, a magnetoresistive element layer formed on the lower gap layer, a lead layer for imparting a sensing current to the magnetoresistive element layer, an upper gap layer formed on the lead layer, and an upper shield layer formed on the upper gap layer, wherein at least either of the lower gap layer and upper gap layer includes an Al—N—X insulating layer, where the element X is at least one element selected from the group consisting of Si, B, Cr, Ti, Ta and Nb.

The content of the element X in the insulating layer in the aforementioned thin film magnetic head may preferably ranges from 2.0 to 30.0 atomic percent in terms of composition ratio.

In addition and advantageously, the invention provides a process for producing a thin film magnetic head in which a gap layer including an Al—N—X insulating layer is formed by depositing crystallized layers in turn on a substrate having a magnetoresistive element layer provided in a film-forming chamber capable of vacuum exhausting, the element X being at least one element selected from the group consisting of Si, B, Cr, Ti, Ta and Nb, wherein the insulating layer is formed while heating the substrate.

In the above process, the substrate may preferably be heated at a temperature equal to or lower than 250° C.

BRIEF DESCRIPTION OF THE DRAWINGS

These and other features, objects, and advantages of the present invention will become apparent upon a consideration of the following description of the invention when read in conjunction with the drawings, in which.

DESCRIPTION OF THE PREFERRED EMBODIMENT

Illustrative configurations of embodiments of the thin film magnetic head of the invention will now be described in detail below with reference to the drawings.

FIGS. 1–4 are the illustrative configuration of the first embodiment of the magnetic head of the invention.

Figure 1:
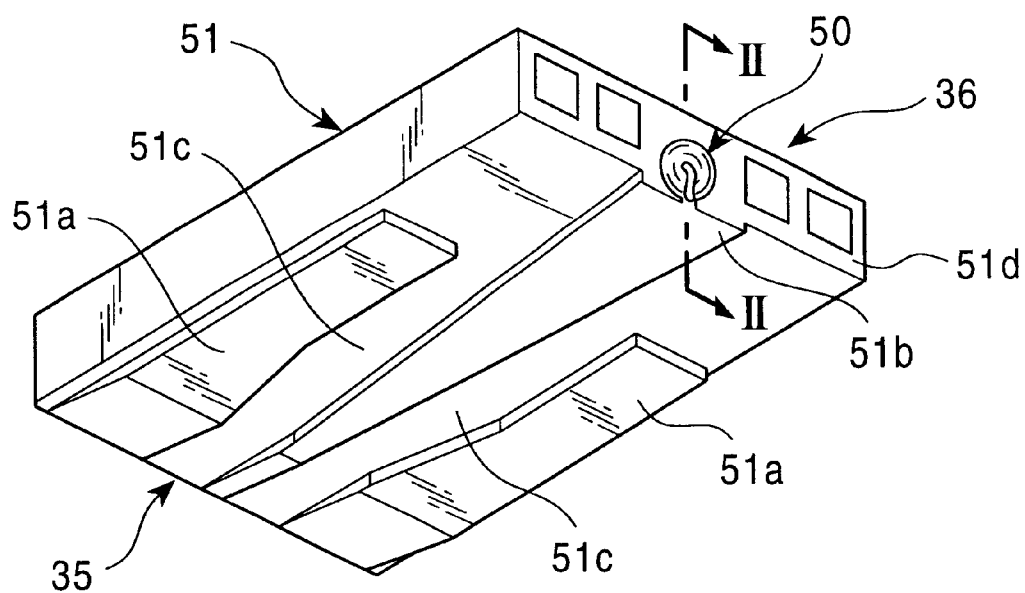
FIG. 1 is an oblique view illustrating a first embodiment of the thin film magnetic head according to the invention.

The magnetic head of the first embodiment is a floating type head mounted on, for example, hard disk drives. One side 35 of a slider 51 of the magnetic head of FIG. 1 is a leading side oriented to the upstream of the moving direction of a disk and, the other side 36 is a trailing side. On a surface of the slider 51 opposed to the disk are formed rail-shaped air bearing surfaces (ABSs) 51a, 51a and 51b and air grooves 51c and 51c.

On an edge 51d of the trailing side of the slider 51 is provided a thin film magnetic head 50.

Figure 2:
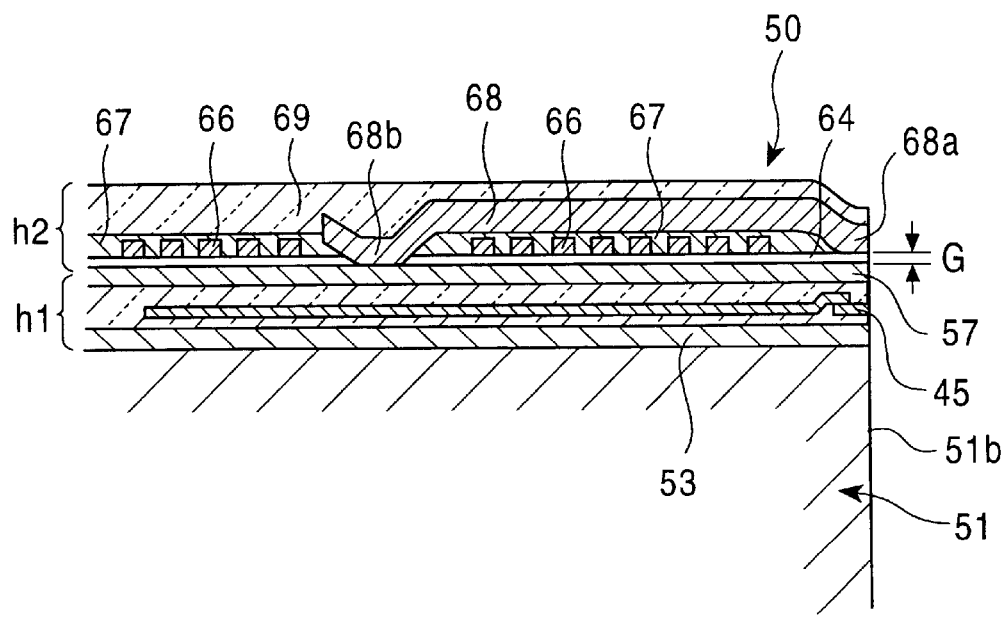
FIG. 2 is a sectional view illustrating substantial parts of the thin film magnetic head shown in FIG. 1.
Figure 3:
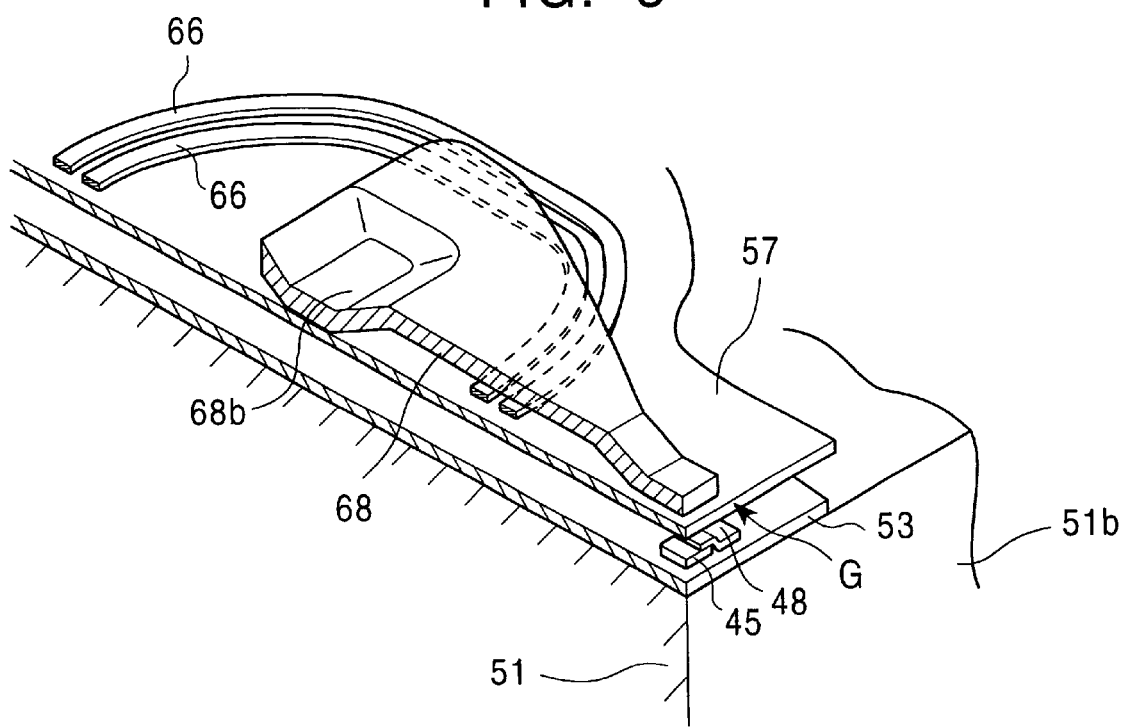
FIG. 3 is an oblique and partially sectional view illustrating the thin film magnetic head shown in FIG. 1.

The thin film magnetic head 50 as shown in this embodiment is a composite magnetic head as illustrated in its sectional configuration in FIGS. 2 and 3, being composed of an MR head (reading head) h1 and an inductive head (writing head) h2 are laminated in this order on the edge 51d of the trailing side of the slider 51.

The inductive head h2 is composed of a lower core layer 57, a gap layer 64 formed on the core layer 57, a coil layer 66 whose plane shape is helical formed on the gap layer 64, and an insulating material layer 67 surrounding the coil layer 66. An upper core layer 68 formed on the insulating material layer has its front edge 68a facing to the lower core layer 57 on the ABS 51b with a fine gap, and its base edge 68b in magnetic communication with the lower core layer 57.

On the upper core layer 68 is formed a protective layer 69 fabricated of, for example, aluminium oxide ($Al_2O_3$).

In the inductive head h2, a recording current is applied to the coil layer 66, and supplied from the coil layer 66 to the core layers. A leakage magnetic field from edges of the lower core layer 57 and the upper core layer 68 at a magnetic gap G allows a recording medium such as a hard disk to record magnetic signals.

The lower core layer in the inductive head h2 also serves as the upper shield layer 57 of the MR head h1.

The MR head h1 detects a leakage magnetic field from a recording medium such as a hard disk utilizing the magnetoresistive effect to read recording signals.

Figure 4:
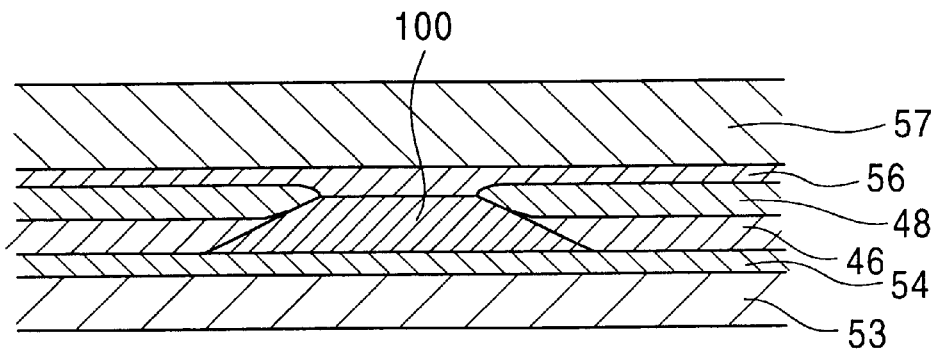
FIG. 4 is a sectional view illustrating a configuration of an MR head provided in the thin film magnetic head shown in FIG. 1.

The MR head h1, as illustrated in FIG. 4, is composed of a lower shield layer 53 formed of sendust or a Ni—Fe system alloy (Permalloy; trade mark) on the trailing-side edge of the slider 51, and a lower gap layer 54 formed on the lower shield layer 53.

On the lower gap layer 54 is formed a magnetoresistive element layer 100. The magnetoresistive element layer 100 is, for example, an AMR element having a three-layer structure of an SAL layer made of a soft magnetic material (Co—Zr—Mo system alloy or Ni—Fe—Nb system alloy), a SHUNT layer of a nonmagnetic material (e.g., Ta) and an MR layer having the magnetoresistive effect (a Ni—Fe system alloy), or a spin-valve type thin film element (a kind of GMR elements) composed of a four-layer structure of an antiferromagnetic layer (e.g., Pt—Mn alloy), a pinned magnetic layer (e.g., Ni—Fe system alloy, Co, Co—Fe system alloy, Co—Ni system alloy, Ni—Fe—Co system alloy), nonmagnetic conductive layer (Cu) and a free magnetic layer (e.g., Ni—Fe system alloy, Co, Co—Fe system alloy, Co—Ni system alloy, Ni—Fe—Co system alloy).

On both sides of the magnetoresistive element 100 are formed a hard magnetic bias layer 46 and a lead layer 48. When the magnetoresistive element layer 100 is, for instance, formed of the spin-valve type thin film element, a bias magnetic field from the hard magnetic bias layer 46 is supplied to the free magnetic layer, and a sensing current from the lead layer 48 is supplied to the pinned magnetic layer, nonmagnetic conductive layer and free magnetic layer.

The hard magnetic bias layer 46 is fabricated of, for example, a Co—Pt (cobalt-platinum) alloy or a Co—Cr—Pt (cobalt-chromium-platinum) alloy. The lead layer 48 is fabricated of, for instance, Cr (chromium), Ta (tantalum) or Cu (copper).

An upper gap layer 56 is formed on the lead layer 48, and an upper shield layer 57 made of a magnetic material such as Permalloy (trade mark) is formed on the upper gap layer 56.

According to the invention, at least either of the lower gap layer 54 and the upper gap layer 56 (hereinafter referred to as "gap layer 54, 56") is fabricated of an AlN film.

Such an AlN film has a higher thermal conductivity than $Al_2O_3$ and $SiO_2$ which have been conventionally used as the gap layer 54, 56 (see Table 1 above). Consequently, the invention, where the gap layer 54, 56 is formed of an AlN film, can improve the thermal conductivity of the gap layer 54, 56.

The AlN film used as the gap layer 54, 56 should preferably have, in its film structure, a higher volume ratio of a crystalline phase. To be more preferable, the whole film structure of the gap layer is composed of a crystalline phase.

A plane of the crystalline phase is advantageously in preferred orientation in the direction perpendicular to the plane of the film to improve the thermal conductivity of the insulating film made of the AlN film.

By way of illustration, it is preferable to preferred-orient the (002) plane or (220) plane of the crystalline phase in the direction perpendicular to the film plane.

According to the invention, the range of the mean crystal grain size of the AlN film is specified in order to enhance various characteristics of the film such that the orientation of the AlN film is increased to improve its thermal conductivity (heat dissipating property) and to enhance the corrosion resistance against alkali aqueous solutions.

The mean crystal grain size of the AlN film should preferably fall in the range from 85 angstroms to 130 angstroms, and more preferably from 95 angstroms to 130 angstroms (see FIG. 14; the figure will be described later).

The use of the AlN film having a mean crystal grain size within the above specified range can enhance the thermal conductivity (heat dissipating property), and reduce an etching rate (corrosion resistance) against alkali aqueous solutions. To be more specific, the etching rate can be reduced to about 150 angstrom/min or below.

By regulating the mean crystal grain size of the AlN film within the above specified range, the AlN film can have a hardness Hv of equal to or more than 2000, and a surface roughness Ra of equal to or less than 0.8 nm (equal to or less than 0.4 nm when the mean crystal grain size is to be equal to or more than 95 angstroms), and a surface resistance of equal to or more than $10^9 \Omega$.

According to the invention, the lattice parameter of the AlN film can be specified to obtained the above advantageous characteristics.

Such an AlN film has a hexagonal crystal structure, and the lattice parameter means the length one side, a-axis, of the hexagon.

The AlN film should preferably have, consequently, a lattice parameter ranging from 2.67 angstroms to 2.7 angstroms, and more preferably from 2.68 angstroms to 2.7 angstroms (see FIG. 15; the figure will be described later).

By specifying the lattice parameter of the AlN film to the above range, its thermal conductivity (heat dissipating property) can be enhanced, and the film can have an etching rate (corrosion resistance) against an alkali aqueous solution of equal to or less than about 150 angstrom/min, a hardness Hv of equal to or more than 2000, a surface roughness Ra of equal to or less than 0.8 nm (equal to or less than 0.5 nm when the lattice parameter is to be equal to or more than 2.68 angstroms), and a surface resistance of equal to or more than $10^9 \Omega$.

The mean crystal grain size of the AlN film accompanies with its lattice parameter, and the lattice parameter increases with an increasing mean crystal grain size and decreases with a decreasing mean crystal grain size.

Figure 14:
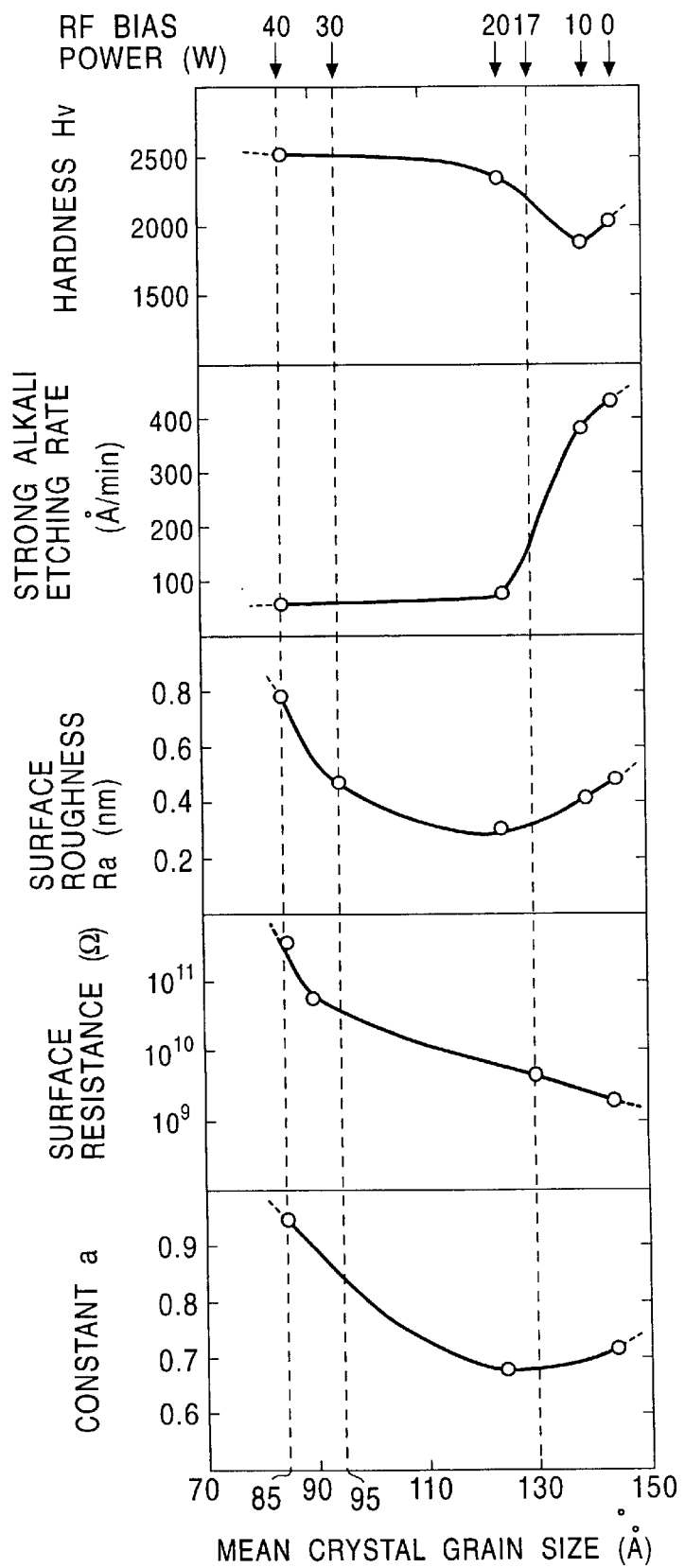
FIG. 14 is a graph of the relationship between the mean crystal grain size and the individual characteristics of the AlN film based upon the graphs of FIGS. 6–13 (excluding FIG. 7)
Figure 15:
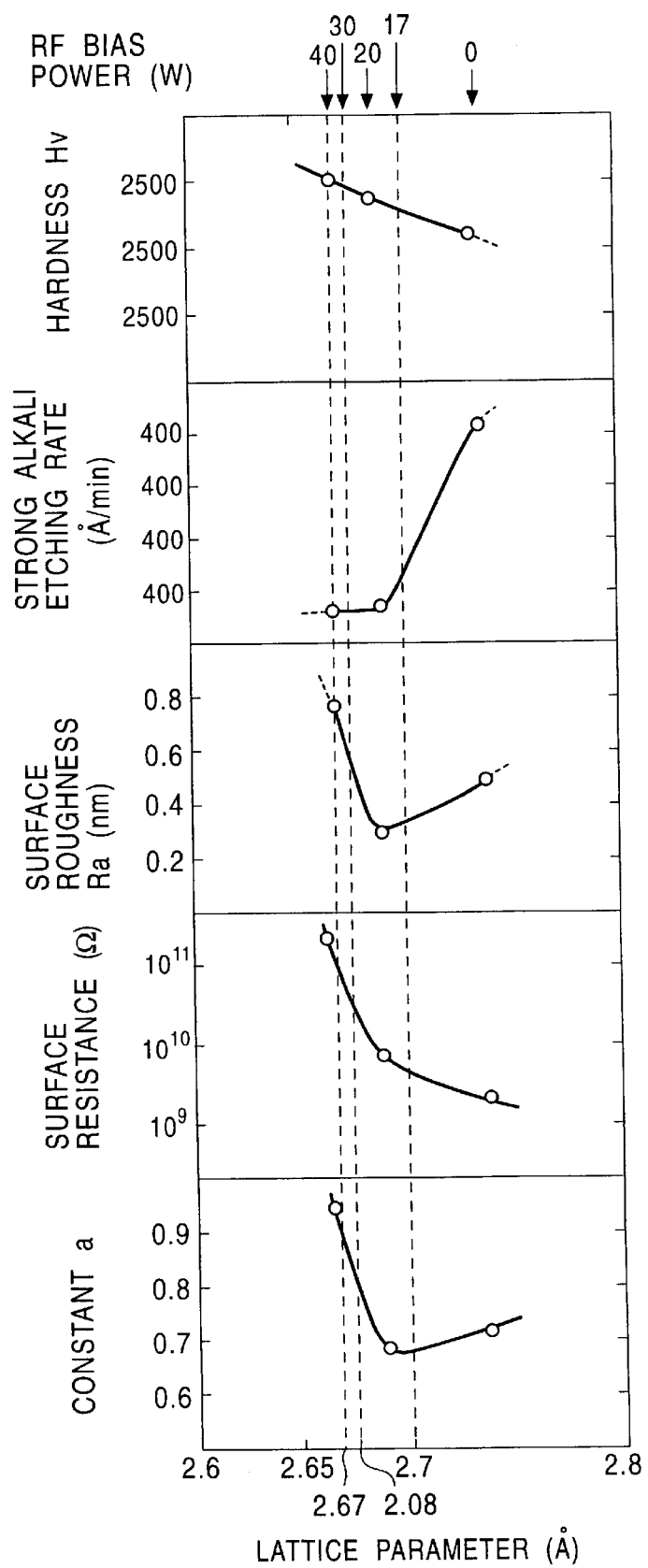
FIG. 15 is a graph of the relationship between the lattice parameter and the individual characteristics of the AlN film based upon the graphs of FIGS. 7–13.

As is clear from comparison between FIGS. 14 and 15, the graph of FIG. 14 illustrating the relationship between the mean crystal size and individual characteristics almost overlaps the graph of FIG. 15 illustrating the relationship between the lattice parameter and individual characteristics, when the abscissa parameters of the former are reduced.

Figure 5:
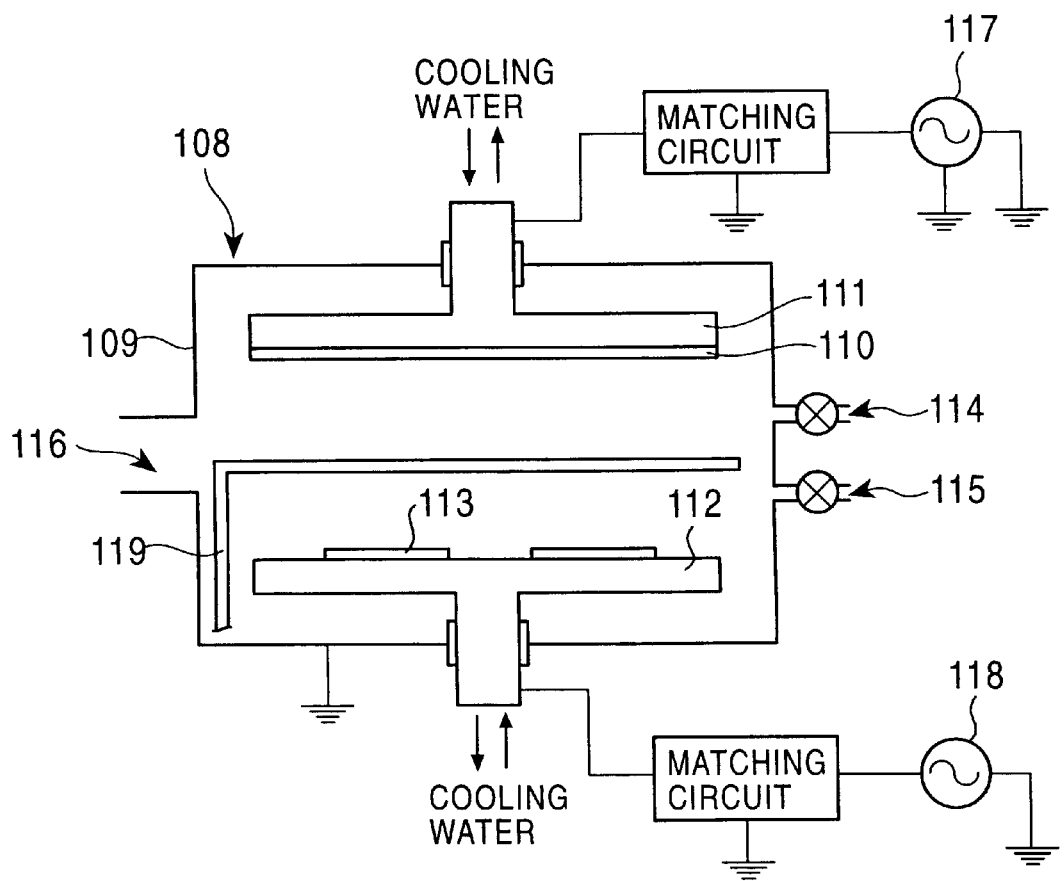
FIG. 5 is a block diagram illustrating the internal configuration of a sputtering apparatus according to the invention used for forming the thin film magnetic head shown in FIG. 4.

The mean crystal size and lattice parameter of the AlN film are regulated through bias power supplied to the substrate side of a sputtering apparatus illustrated in FIG. 5.

FIG. 5 is a block diagram illustrating the internal configuration of a sputtering apparatus used in the sputtering process of the invention for producing the MR head shown in FIG. 4.

The internal configuration of the sputtering apparatus illustrated in FIG. 5 will be described below.

In a chamber 109 of a sputtering apparatus 108, as illustrated in FIG. 5, are provided an electrode unit 111 for mounting a target 110, and a substrate-supporting unit 112 at the opposite position to the target 110. On the substrate-supporting unit 112 is provided a substrate 113.

The sputtering apparatus according to the invention can be a magnetron sputtering apparatus having a magnet in the electrode unit 111 of FIG. 5.

The chamber 109 is provided with gas inlets 114 and 115, through which $N_2$ and Ar are introduced into the chamber, a gas outlet 116 and a shutter 119.

In this apparatus, radio frequencies are applied from a radio frequency power source (RF power source) 117 to the electrode unit 111 to generate magnetron discharge through the interaction between an electric field and magnetic filed, and the target 110 is sputtered to form a thin film on the substrate 113 provided at the opposed position to the target 110.

The MR head h1 illustrated in FIG. 4 can be formed on the substrate 113 shown in FIG. 5 in the following manner: Initially, using a target material formed of, for example, Permalloy (trade mark), a lower shield layer 53 (FIG. 4) fabricated of Permalloy is formed on the substrate 113.

Next, using an AlN target material as the target 110, an AlN film is formed on the lower shield layer 53. In this step, bias power is supplied to the substrate 113 side as well as to the target side according to the invention.

A radio frequency power source (RF power source) 118 is, as illustrated in FIG. 5, connected to the substrate-supporting unit 112, and high frequencies are applied from the RF power source to the substrate-supporting unit 112.

The frequency applied to the electrode unit 111 supporting the target 110 and that applied to the substrate-supporting unit 112 supporting the substrate 113 may be either different or identical, whereas the bias power supplied to the substrate-supporting unit 112 should be lower than the bias power supplied to the electrode unit 111.

By way of illustration, the bias power supplied to the electrode unit 111 is about 700 W, whereas the bias power supplied to the substrate-supporting unit 112 should preferably range from 17 W to 40 W and more preferably from 17 W to 30 W.

Figure 6:
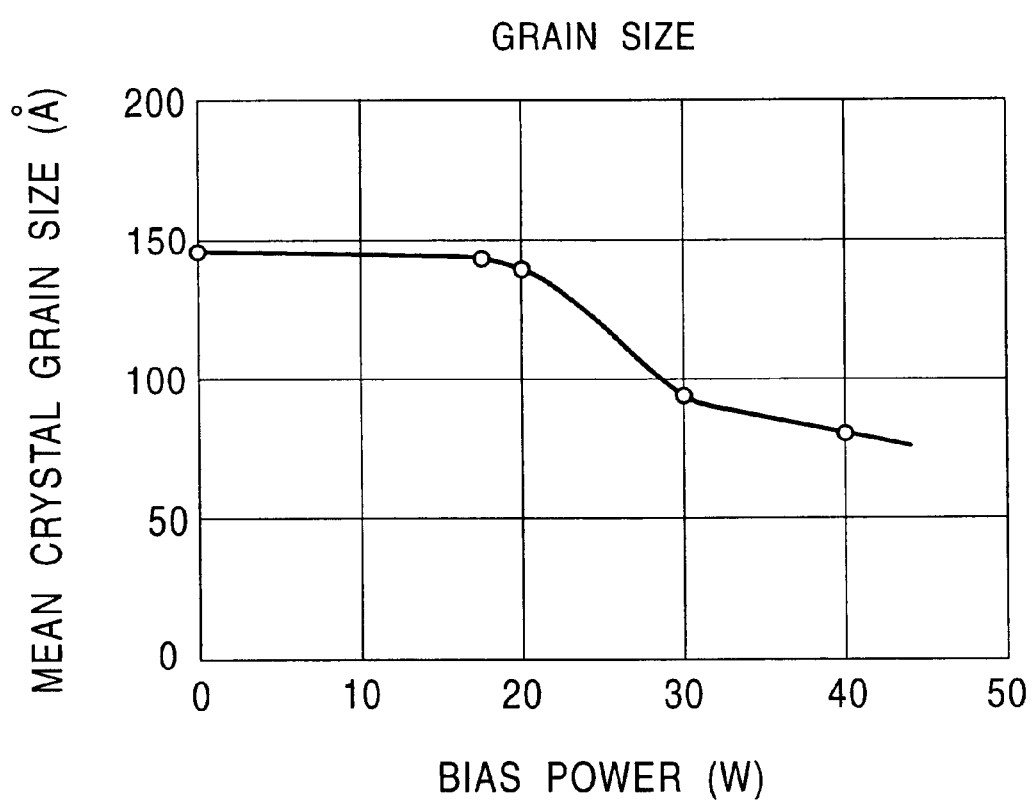
FIG. 6 is a graph of the relationship between bias power supplied to a substrate side and the mean crystal grain size of an AlN film formed on the substrate.
Figure 7:
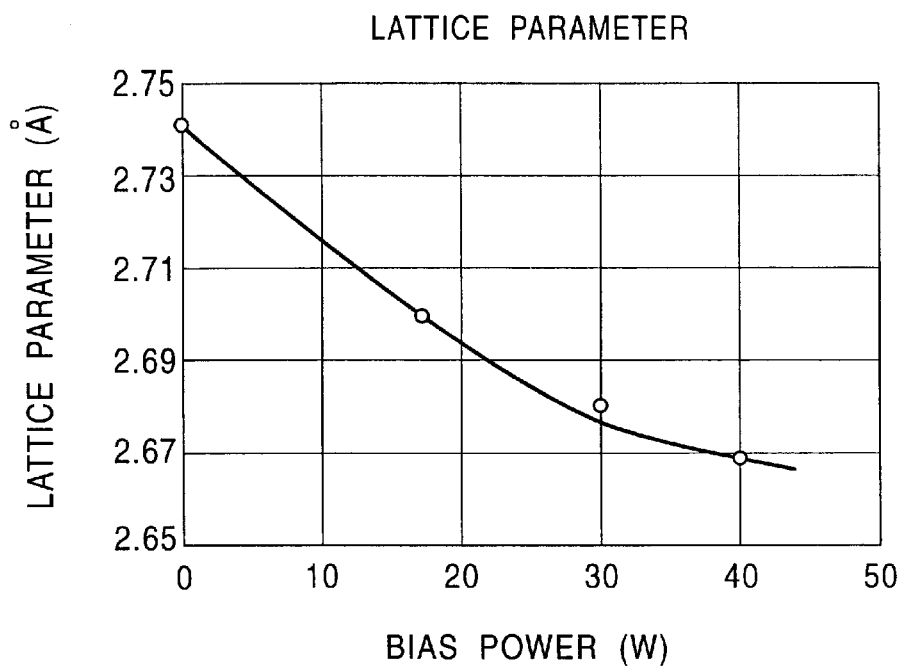
FIG. 7 is a graph of the relationship between the bias power supplied to the substrate side and the lattice parameter of the AlN film formed on the substrate.

FIGS. 6 and 7 demonstrates that the mean crystal grain size and lattice parameter of the AlN film decrease with an increasing bias power supplied to the substrate-supporting unit 112.

An increasing bias power supplied to the substrate-supporting unit 112 is preferable to enhance the hardness Hv (FIG. 8) and surface resistance (FIG. 11) and to reduce the etching rate by an alkali aqueous solution (FIG. 9) of the AlN film, but it also increase the surface roughness Ra (FIG. 10) and deteriorates the heat dissipating property (thermal conductivity) of the film.

The reason why the surface roughness Ra increases with an increasing bias power supplied to the substrate-supporting unit 112 is that an AlN film formed on the substrate 113 is reverse-sputtered and its surface is shaved.

When the surface of the AlN film is roughened, the magnetoresistive element layer 100 to be formed on the lower gap layer 54 fabricated of the AlN film (FIG. 4) cannot be formed satisfactorily thin, so as to deteriorate the reproducing characteristics.

If the upper gap layer 56 is formed of an AlN film, however, the AlN film may have a somewhat roughed surface as a layer to be formed on the upper gap layer 56 is the upper shield layer 57 thick in thickness.

The bias power supplied to the substrate-supporting unit 112 according to the invention should preferably range from 17 W to 40 W and more preferably from 17 W to 30 W to enhance the heat dissipating property, hardness Hv and the surface resistance and to reduce the etching rate by an alkali aqueous solution and the surface roughness Ra, as seen from the graphs of FIGS. 14 and 15 illustrating the relationship between the bias power (the mean crystal grain size and lattice parameter of the AlN film corresponding to the bias power) and individual characteristics.

According to the invention, the bias power can be supplied to the substrate 113 as well as to the target in the sputtering apparatus 108 used for the formation of an AlN film, and the bias power should range from 17 W to 40 W.

By regulating the bias power within the above range, the AlN film can have a mean crystal grain size ranging from 85 angstroms to 130 angstroms, and a lattice parameter ranging from 2.67 angstroms to 2.7 angstroms.

The bias power should more preferably fall in the range from 17 W to 30 W, and within this range, the AlN film can have a mean crystal grain size ranging from 95 angstroms to 130 angstroms, and a lattice parameter ranging from 2.68 angstroms to 2.7 angstroms.

By regulating the mean crystal grain size or lattice parameter of the AlN film within the above ranges, the denseness of the film can be increased and the formation of pinholes or other defects can be minimized.

Consequently, the thermal conductivity (heat dissipating property) of the AlN film can be enhanced to transfer heat generated through the magnetoresistive element layer 100 to the shield layers 53 and 57 with a high efficiency.

By transferring heat sufficiently to the shield layers 53 and 57, the element temperature increase of the magnetoresistive element layer 100 can be suppressed to give a satisfactory reproducing sensitivity.

According to the invention, the corrosion resistance of the AlN film can be improved by regulating its mean crystal grain size or lattice parameter within the above ranges.

The gap layer 54, 56 should hardly be soluble in an alkali aqueous solution, which is used as a developer in the resist patterning step.

In addition, the invention can improve the hardness Hv and surface resistance and minimize the surface roughness Ra of the AlN film.

EXAMPLE 1

Using the sputtering apparatus illustrated in FIG. 5, a series of AlN films were formed on the substrate 113 with varying bias power supplied to the substrate-supporting unit 112, and the AlN films obtained at individual bias power were subjected to measurement of its characteristics.

The bias power supplied to the electrode unit 111 of FIG. 5 was fixed at 700 W in this example.

FIG. 6 is a graph illustrating the relationship between the bias power and the mean crystal grain size of the AlN film, demonstrating that the mean crystal grain size decreases with an increasing bias power.

FIG. 7 is a graph illustrating the relationship between the bias power and the lattice parameter of the AlN film, demonstrating that the lattice parameter decreases with an increasing bias power.

Figure 8:
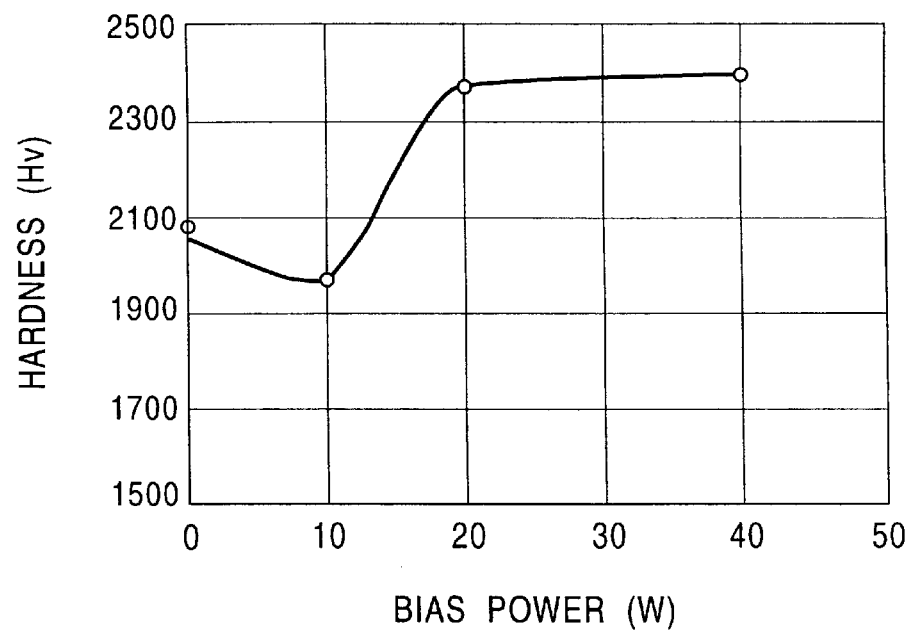
FIG. 8 is a graph of the relationship between the bias power supplied to the substrate side and the hardness Hv of the AlN film formed on the substrate.

FIG. 8 is a graph illustrating the relationship between the bias power and the hardness Hv of the AlN film, which demonstrates that the hardness Hv increases with an increasing bias power, in especial at equal to or more than 10 W.

Figure 9:
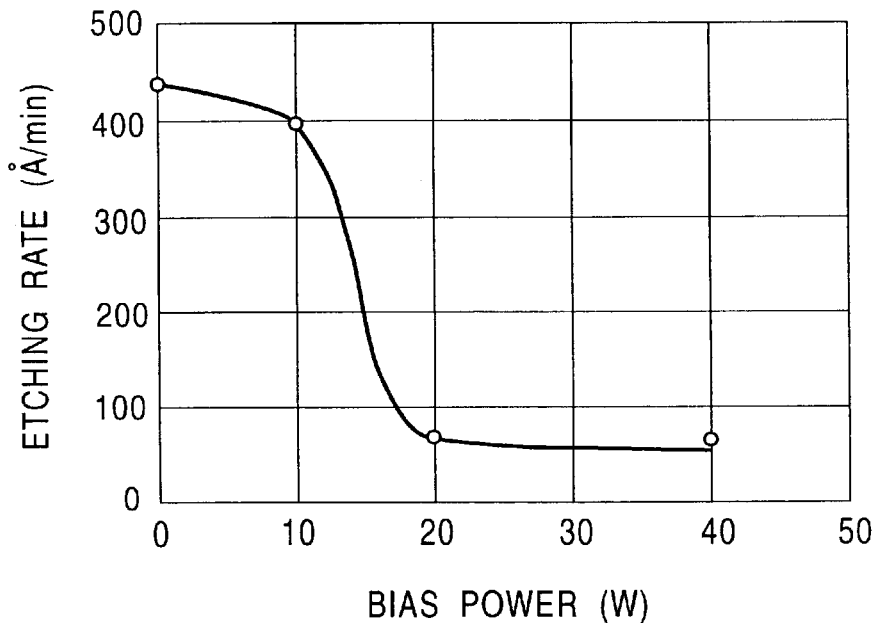
FIG. 9 is a graph of the relationship between the bias power supplied to the substrate side and the etching rate by an alkali aqueous solution of the AlN film formed on the substrate.

FIG. 9 is a graph illustrating the relationship between the bias power and the etching rate by an alkali aqueous solution, demonstrating that the etching rate decreases an increasing bias power, in especial at equal to or more than 10 W.

Figure 10:
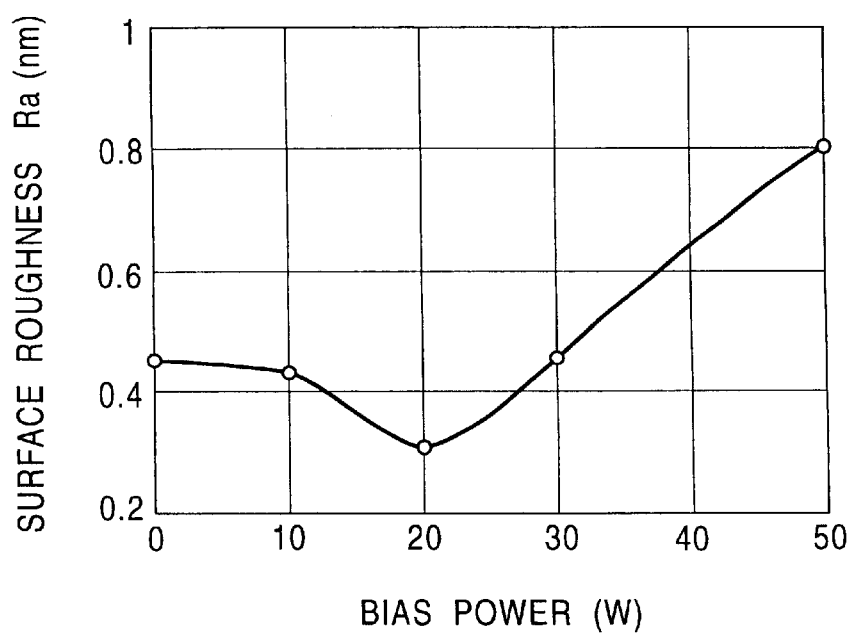
FIG. 10 is a graph of the relationship between the bias power supplied to the substrate side and the surface roughness Ra of the AlN film formed on the substrate.

As is shown in FIG. 10 illustrating the relationship between the bias power and the surface roughness Ra of the AlN film, the surface roughness Ra of the AlN film decreases with an increasing bias power up to about 20 W, but increases at a bias power of equal to or more than 20 W.

The reason why the surface roughness Ra increases with an increasing bias power is that the formed AlN film is reverse-sputtered and the surface of the AlN film is shaved.

Figure 11:
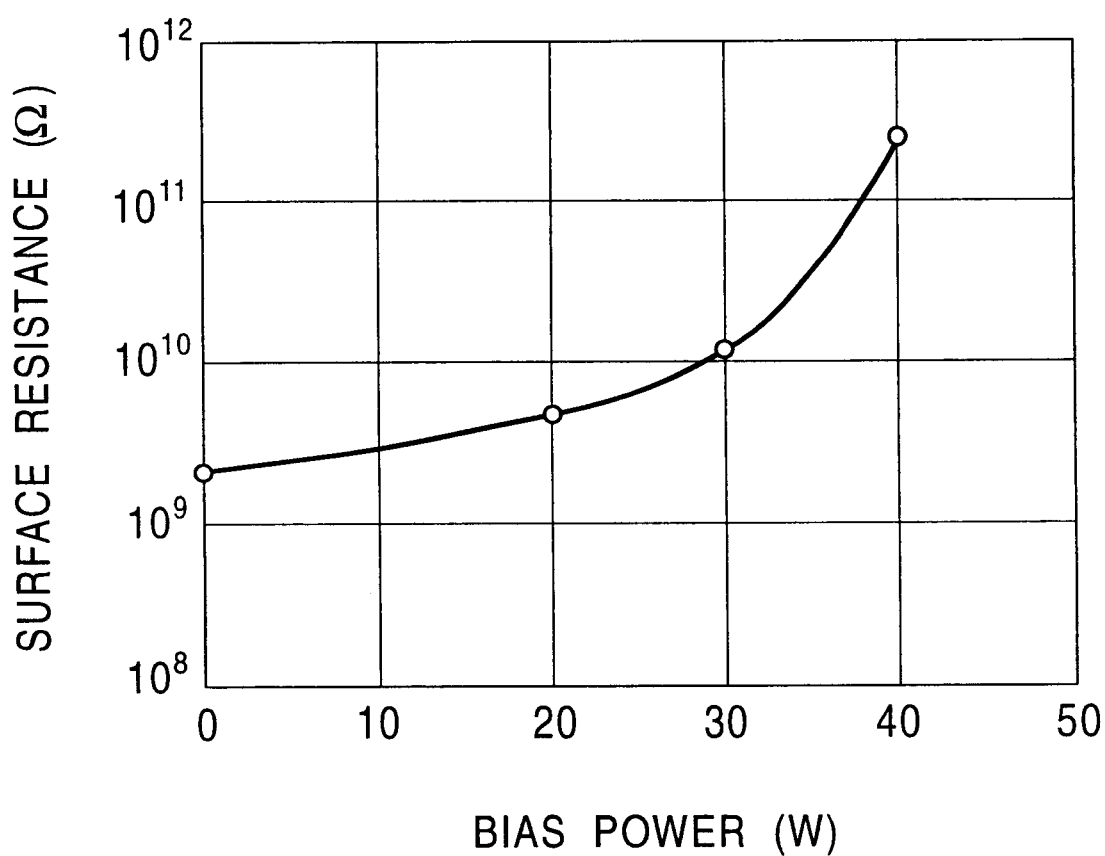
FIG. 11 is a graph of the relationship between the bias power supplied to the substrate side and the surface resistance of the AlN film formed on the substrate.

FIG. 11 is a graph illustrating the relationship between the bias power and the surface resistance of the AlN film, demonstrating that the surface resistance increases with an increasing bias power.

Between the gap layers 54 and 56 is formed the lead layer 48, as illustrated in FIG. 4, and an electric current is supplied via the lead layer 48 to the magnetoresistive element layer 100.

Consequently, it is preferable to increase the surface resistance of the gap layer 54, 56 for the purpose of inhibiting a current passing from the lead layer 48 to the magnetoresistive element layer 100 from transmitting to the gap layer 54, 56.

Next, the orientation of the (002) plane in the AlN film was examined to determine the relationship between the orientation of the (002) plane and the temperature increase rate of the element.

Figure 12:
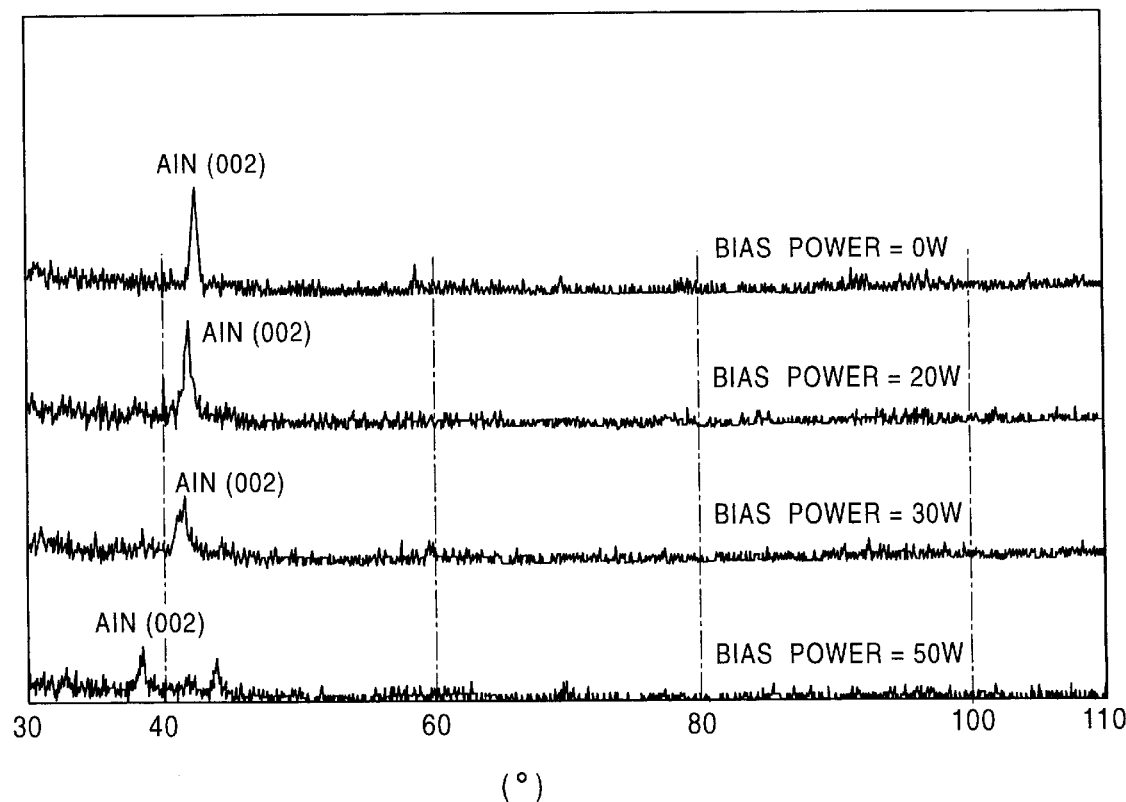
FIG. 12 is an X-ray diffraction patterns of AlN films formed with bias power supplied to the substrate side of 0 W, 20 W, 30 W and 50 W.

FIG. 12 is X-ray diffraction patterns of AlN films formed at a bias power of 0 W, 20 W, 30 W or 50 W, respectively.

FIG. 12 demonstrates that peaks of the (002) plane increase at any bias power, whereas they gradually decrease with an increasing bias power.

Next, a series of AlN films were formed with varying bias power of 0 W, 20 W and 40 W, and using the formed AlN films as the gap layer 54, 56, the element temperature increase of the magnetoresistive element layer 100 was determined.

The element temperature increase rate was determined by the magnitude of increase of the element temperature from the element temperature at a sensing current of 0 mA.

Figure 13:
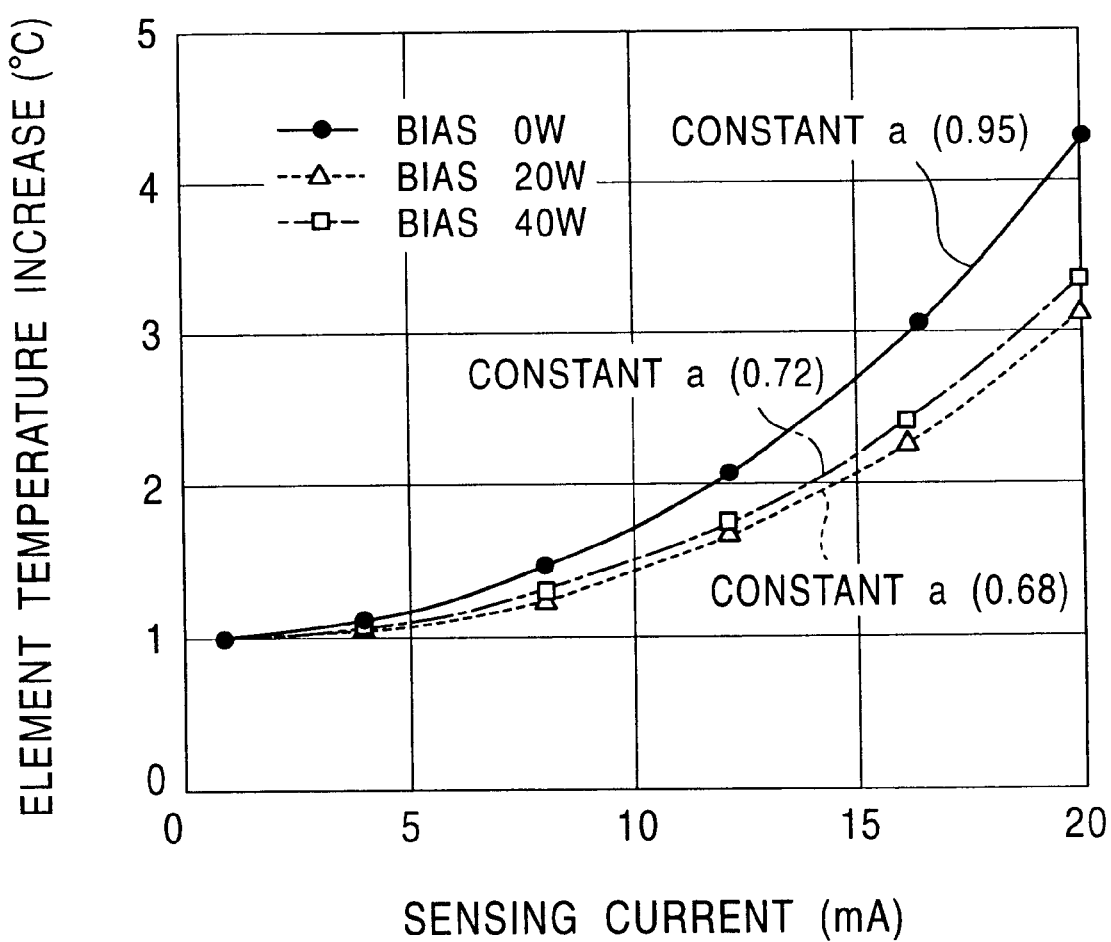
FIG. 13 is a graph of the relationship between the sensing current and the temperature increase of the element when the gap layers are fabricated of AlN films with bias power of 0 W, 20 W and 40 W.

FIG. 13, a graph illustrating the relationship between the sensing current and the element temperature increase, demonstrates that the element temperature increases with an increasing sensing current at any bias power of 0 W, 20 W and 40 W for the formation of the AlN film.

As is shown in FIG. 13, the element temperature most increases at the bias power of 0 W, moderately increases at the bias power of 40 W, whereas the increase can be minimized at the bias power of 20 W.

The curves with respect to individual bias power shown in FIG. 13 were considered as quadrics ($Y=aX^2+b$; wherein "a" and "b" are constants) and the constants "a" in individual curves were determined. The less the constant "a" is, the more the thermal conductivity (heat dissipating property) of the material is.

As a result, the constants "a" were 0.95, 0.72 and 0.68 respectively at the bias power of 0 W, 40 W and 20 W.

FIGS. 14 and 15 are graphs compiling the results of FIGS. 9–13 (the hardness Hv, etching rate by an alkali aqueous solution, surface roughness Ra, surface resistance, constant "a" of the AlN film) with respect to the relationship with the mean crystal grain size and lattice parameter of the AlN film illustrated in FIGS. 6 and 7.

FIG. 14 is a graph illustrating the relationship between the mean crystal grain size and individual characteristics of the AlN film.

It is preferable in the invention that the AlN film has a hardness Hv of equal to or more than 2000, an etching rate by an alkali aqueous solution of equal to or less than 200 angstrom/min, and a surface resistance of equal to or more than $10^9\Omega$, and FIG. 14 demonstrates that an AlN film meeting these conditions has a mean crystal grain size of equal to or less than 130 angstroms.

An excessively small mean crystal grain size, however, invites an increased surface roughness Ra of the AlN film and increased constant "a", and is not preferable. The term "constant "a"" used herein means the value of constant "a" when the curves of the relationship between the sensing current and the element temperature increase (FIG. 13) are considered as "$Y=aX^2+b$", as described above.

In other words, FIG. 13 demonstrates that the element temperature increase can be suppressed by decreasing constant "a". By decreasing constant "a", the heat dissipating property (thermal conductivity) of the AlN film can also be enhanced.

The mean crystal grain size of the AlN film according to the invention should preferably be at least 85 angstroms.

As thus described, the AlN film according to the invention should preferably have a mean crystal grain size ranging from 85 angstroms to 130 angstroms.

The bias power required to form such an AlN film ranges from 17 W to 40 W, as illustrated in the top of FIG. 14.

The mean crystal grain size of the AlN film according to the invention should more preferably range from 95 angstroms to 130 angstroms.

The bias power required to form this AlN film ranges from 17 W to 30 W, as illustrated in the top of FIG. 14.

By regulating the mean crystal grain size of the AlN film to equal to or more than 95 angstroms, the surface roughness Ra can be suppressed below 0.4 nm and the constant "a" can be reduced below 0.8 to enhance the heat dissipating property.

FIG. 15 is a graph illustrating the relationship between the lattice parameter and individual characteristics of the AlN film.

It is preferable, as in FIG. 14, that the AlN film has a hardness Hv of equal to or more than 2000, an etching rate by an alkali aqueous solution of equal to or less than 200 angstrom/min, a surface resistance of equal to or more than $10^9\Omega$, and a surface roughness Ra of equal to or less than 0.8 nm and that the constant "a" is equal to or less than 0.9. FIG. 15 demonstrates that an AlN film meeting these conditions has a lattice parameter ranging from 2.67 angstroms to 2.7 angstroms.

The surface roughness Ra of equal to or less than 0.4 nm and the constant "a" of equal to or less than 0.8 are more preferred, and the lattice parameter of the AlN film should more preferably range from 2.68 angstroms to 2.7 angstroms for meeting this condition.

The lattice parameter of the AiN film can be regulated in the range of 2.67 angstroms to 2.7 angstroms by setting the bias power in the range from 17 W to 40 W as illustrated in the t op of FIG. 15, which relationship is similar to the case where the mean crystal grain size of the AlN film is regulated to the range from 85 angstroms to 130 angstroms (FIG. 14).

FIG. 15 also demonstrates in its top that the lattice parameter of the AlN film can be in the range from 2.67 angstroms to 2.7 angstroms by setting the bias power in the range from 17 W to 30 W, which relationship is similar to the case where the mean crystal grain size of the AlN film is regulated to the range from 95 angstroms to 130 angstroms (FIG. 14).

In other words, the bias power supplied to the substrate-supporting unit 112 of FIG. 5 ranging from 17 W to 40 W can ensure the mean crystal grain size and lattice parameter of the AlN film to range from 85 angstroms to 130 angstroms, and ranging form 2.67 to 2.7, respectively.

The bias power should more preferably range from 17 W to 30 W, and by configuring this, the AlN film can have a mean crystal grain size ranging from 95 angstroms to 130 angstroms, and a lattice parameter ranging from 2.68 angstroms to 2.7 angstroms.

This embodiment of the invention, where the gap layer is fabricated of an AlN film having a mean crystal grain size ranging from 85 angstroms to 130 angstrom or having a lattice parameter ranging from 2.67 angstroms to 2.7 angstroms, as described in detail above, can increase the denseness of the film and improve the heat dissipating property and corrosion resistance against an alkali aqueous solution.

The use of the AlN film having a mean crystal grain size and lattice parameter within the above ranges can enhance the hardness, increase the surface resistance and reduce the surface roughness of the AlN film.

More preferably, the AlN film should have a mean crystal grain size ranging from 95 angstroms to 130 angstroms or a lattice parameter ranging from 2.68 angstroms to 2.7 angstroms.

According to the invention, bias power can be supplied also to the substrate in the sputtering apparatus used for the formation of the AlN film, and the mean crystal grain size and lattice parameter of the AlN film can be controlled within the above specified ranges by regulating the bias power supplied to the substrate side.

To be more specific, by adjusting the bias power in the range from 17 W to 40 W, the AlN film can have a mean crystal grain size ranging from 85 angstroms to 130 angstroms, and a lattice parameter ranging from 2.67 angstroms to 2.7 angstroms.

More preferably, by regulating the bias power in the range from 17 W to 30 W, the AlN film can have a mean crystal grain size ranging from 95 angstroms to 130 angstroms, and a lattice parameter ranging from 2.68 angstroms to 2.7 angstroms.

Next, the second embodiment of the thin film magnetic head of the invention will now be described below.

In this embodiment, as illustrated in FIGS. 1 to 3, the slider and inductive head h2 and other components are the same as in the first embodiment. The MR head h1 will be described herein in detail.

Figure 16:
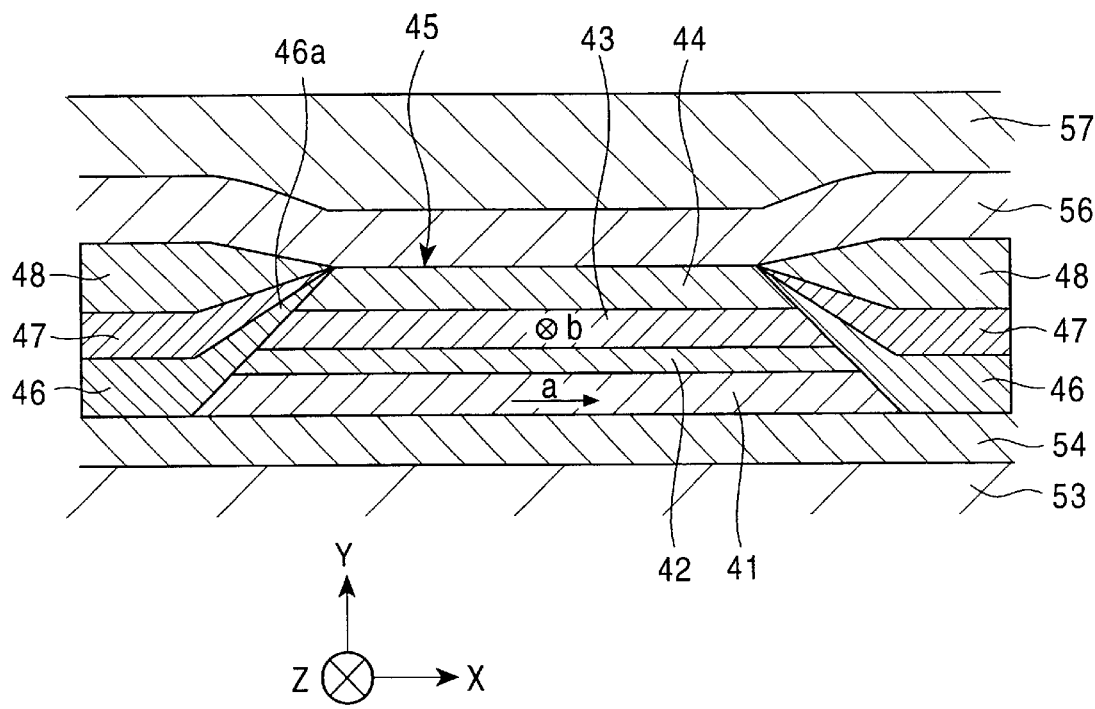
FIG. 16 is a sectional view illustrating the configuration of an MR head provided in a second embodiment of the thin film magnetic head according to the invention.

The MR head h1 of this embodiment is for detecting a leakage flux from a recording medium such as a disk utilizing the magnetoresistive effect to read magnetic signals. The MR head h1 is composed of, as illustrated in FIG. 16, a lower shield layer 53 formed on the trailing side edge of the slider 51 and fabricated of sendust (Fe—Al—Si) or other magnetic alloy and a lower gap layer 54 formed on the lower shield layer 53.

On the lower gap layer 54 is laminated a GMR element layer 45 as a magnetoresistive element layer. On both sides of the GMR element layer 45 are provided ferromagnetic layers 46, 46, and on individual ferromagnetic layers 46 are laminated insulating layers 47 fabricated of, for example, Ta and lead layers 48 made of, for instance, Cr. The lead layers 48 are to supply a sensing current to the GMR element layer 45. The ferromagnetic layers 46, 46 are to ensure linear responsivity by applying, as bias magnetic field, a leakage flux from these components to a free magnetic layer 22 mentioned below, and to suppress Barkhausen noises.

An upper gap layer 56 is formed on the GMR element layer 45 and lead layers 48, and an upper shield layer 57 is formed on the upper gap layer 56. The upper shield layer 57 also serves as a lower core layer of the inductive head h2 formed on this layer. Preferably at least either of, and more preferably both of, the lower gap layer 54 and upper gap layer 56 may have an Al—N—X system insulating layer in order to dissipate heat generated through a stationary sensing current efficiently, to enhance corrosion resistance against an strong alkali solution and water and to reduce the membrane stress of the gap layer. The element X is at least one element selected from the group consisting of Si, B, Cr, Ti, Ta and Nb. The Al—N—X system insulating layer has a higher thermal conductivity than aluminium oxide ($Al_2O_3$), a higher corrosion resistance against a strong alkali solution and water and a lower membrane stress than AlN.

The insulating layer preferably contains the element X in a composition ratio of 2.0 to 30.0 atomic percent. When the ratio of the element X exceeds 30.0 atomic percent, the thermal conductivity of the gap layer is deteriorated and heat generated through a stationary sensing current cannot be sufficiently dissipated so as to deteriorate the linear responsivity or suppressing effect of Barkhausen noises. When it is less than 2.0 atomic percent, the corrosion resistance against a strong alkali solution and water decreases or the membrane stress increases.

The lower gap layer 54 and/or upper gap layer 56 should preferably be composed of the Al—N—X system insulating layer, whereas it may also have a multilayer structure partially comprising a nonmagnetic material such as aluminium oxide ($Al_2O_3$). In this case, the layer fabricated of aluminium oxide ($Al_2O_3$) or other nonmagnetic material should preferably be provided outer side of the insulating layer so as to dissipate heat generated through a stationary sensing current with a high efficiency, and to serve as a smoothing layer for smoothing convexoconcaves formed on the insulating layer on the GMR element layer 45.

The GMR element layer 45 is a laminate having a trapezoidal cross section obtained by laminating a free magnetic layer 41, a nonmagnetic conductive layer 42, a pinned magnetic layer 43 and an antiferromagnetic layer 44 in this order.

Each of the ferromagnetic layers 41 and 43 is composed of a thin film of a ferromagnetic substance such as Ni—Fe alloys, Co—Fe alloys, Ni—Co alloys, Co, and Ni—Fe—Co alloys. The ferromagnetic layer 43 may be composed of a Co layer, and the ferromagnetic layer 41 may be composed of a Ni—Fe alloy layer, or a laminate of a Co layer and a Ni—Fe alloy layer, or a laminate of a Co—Fe alloy layer and a Ni—Fe alloy layer. When this layer has a dual layer structure of a Co layer and a Ni—Fe alloy layer, it is preferable to arrange a thin Co layer facing to the nonmagnetic conductive layer 42. In the case of a dual layer structure of a Co—Fe alloy layer and a Ni—Fe alloy layer, a thin Co—Fe alloy layer is preferably provided facing to the nonmagnetic conductive layer 42.

This is because, in the system for generating giant magnetoresistance effect in a structure of sandwiching the nonmagnetic conductive layer 42 with the ferromagnetic layers 41 and 43, a large spin dependent scattering effect of conduction electrons can be obtained in a boundary surface between Co and Cu and that a higher magnetoresistive effect with a lower possibility of other factors than the spin dependent scattering of conduction electrons can be obtained when the ferromagnetic layers 41 and 43 are composed of identical material than when composed of different materials. For these reasons, when the ferromagnetic layer 43 is fabricated of Co, it is preferable to substitute part of the ferromagnetic layer facing the nonmagnetic conductive layer 42 with a Co layer in a given thickness. Instead of providing a Co layer separately, it is also preferred to form a concentration-gradient layer by making the ferromagnetic layer 41 of an alloy containing Co more toward the nonmagnetic conductive layer 42 side which gradually increases its Co concentration toward the nonmagnetic conductive layer 42.

When the ferromagnetic layers 41 and 43 are respectively composed of a Co—Fe alloy layer and the nonmagnetic conductive layer 42 is sandwiched with these layers, a high magnetoresistive effect can also be obtained with a large spin dependent scattering effect of conduction electrons in the boundary surface between the Co—Fe alloy layer and the Cu layer and with less possibility of other factors than spin dependent scattering of conduction electrons to thereby give a higher magnetoresistive effect.

The nonmagnetic conductive layer 42 is composed of a nonmagnetic substance such as Cu, Cr, Au or Ag and has a thickness of about 20 to 40 angstroms. When the thickness of nonmagnetic conductive layer 42 is less than 20 angstroms, a magnetic coupling readily occurs between the ferromagnetic layer 41 and the ferromagnetic layer 43. On the contrary, when it exceeds 40 angstroms, scattering of conduction electrons on the boundary surface between the nonmagnetic conductive layer 42 and the ferromagnetic layer 41, which causes the magnetoresistive effect, decreases so as to deteriorate the magnetoresistive effect by means of current diverging effect.

The antiferromagnetic layer 44 is preferably composed of, for example, an $X_1$—Mn alloy, where $X_1$ is preferably at least one element selected from the group consisting of Ru, Rh, Ir, Pd and Pt.

When the element $X_1$ of the $X_1$—Mn alloy is a single metal atom, the preferred content of $X_1$ is 10–45 atomic percent for Ru, 10–40 atomic percent for Rh, 10–40 atomic percent for Ir, 10–25 atomic percent for Pd and 10–25 atomic percent for Pt. In the above description, the term "10–45 atomic percent" means equal to or more than 10 atomic percent and equal to or less than 45 atomic percent, and the upper and lower limits of the numerical ranges indicated in "–" are defined by "equal to or more than" and "equal to or less than".

The Mn system alloy having a composition within the above range has a disordered crystalline structure. The term "disordered crystalline structure" as used herein means that the structure is not an ordered crystalline structure such as a face center tetragonal structure (fct superstructure; CuAuI structure, etc.). In other words, the Mn alloy used herein is obtained without a long-term heating treatment at a high temperature for providing an ordered crystalline structure (e.g., CuAuI structure), and the disordered crystalline structure is a structure obtained by a film-forming process such as sputtering without any other treatment or by subjecting this obtained film to conventional annealing.

The $X_1$—Mn alloy, where the element $X_1$ is at least one element selected from the group consisting of Ru, Rh, Ir, Pd and Pt, should more preferably contain the element $X_1$ in the range of 37–63 atomic percent. In the above descriptions, the term "37–63 atomic percent" means equal to or more than 37 atomic percent and equal to or less than 63 atomic percent, and the upper and lower limits of the numerical ranges indicated in "–" are defined by "equal to or more than" and "equal to or less than".

Such an $X_1$—Mn alloy having a composition within the above range has a face-centered cubic lattice where $X_1$ and Mn atoms order irregularly as it is formed by a film-forming process such as sputtering, and almost no exchange anisotropic magnetic field is generated in a boundary surface with a ferromagnetic layer. Upon being subjected to annealing treatment in a magnetic field, it transforms to a face center tetragonal lattice to form an exchange anisotropic magnetic field ($H_{ex}$) having a large unidirectional anisotropy on the boundary surface with the ferromagnetic layer.

The antiferromagnetic layer 44 may be fabricated of an $X_1$—Mn—$X_2$ alloy, where $X_1$ is preferably at least one element selected from the group consisting of Ru, Rh, Ir, Pd and Pt, and $X_2$ is preferably at least one element selected from the group consisting of Au, Ag, Mg, Al, Si, P, Be, B, C, Se, Ti, V, Cr, Fe, Co, Ni, Cu, Zn, Ga, Ge, Y, Zn, Nb, Mo, Hf, Ta, W, Sn and In. In this alloy, the composition ratio of $X_1$ with respect to Mn, $X_1$:Mn, is 4:6 to 6:4 in atomic percent, and the content of $X_2$ ranges from 0.2 to 10 atomic percent.

When the antiferromagnetic layer 44 is fabricated of an $X_1$—Mn—$X_2$ alloy, it can generate an exchange anisotropic magnetic field ($H_{ex}$) having a large unidirectional anisotropy on the boundary surface with the ferromagnetic layer by subjecting it to annealing in a magnetic field after the film-formation.

The use of the antiferromagnetic layer 44 fabricated of the $X_1$—Mn alloy or $X_1$—Mn—$X_2$ alloy can apply a unidirectional anisotropic exchange magnetic field to the boundary surface with the pinned magnetic layer 43 to fix the rotation of magnetization of the ferromagnetic layer 43 with respect to an external signal magnetic field.

The antiferromagnetic layer 44 composed of the $X_1$—Mn system alloy has a higher corrosion resistance and a lower fluctuation of the exchange anisotropic magnetic field ($H_{ex}$) with temperature changes than an Fe—Mn alloy.

In the configuration illustrated in FIG. 16, bias in the track direction (X direction in FIG. 16) is applied to the free magnetic layer 41 by the ferromagnetic layers 46, 46 to orient its magnetization in the track direction in a single magnetic domain state. The direction indicated by arrow "a" in FIG. 16 is the magnetization direction of the free magnetic layer 41. The magnetization of the ferromagnetic layer 43 is fixed in the Z direction by means of exchange coupling generated by providing the antiferromagnetic layer 44 in contact with the pinned magnetic layer 43. In FIG. 16, the symbol "b" indicates the magnetization direction of the ferromagnetic layer 43. According to the configuration as illustrated in FIG. 16, consequently, a leakage magnetic field of a magnetic medium can be detected by electrical resistance changes of the GMR element layer 45, which resistance changes are due to the magnetization changes of the free magnetic layer 41 as the leakage magnetic field of the magnetic medium transferring in the Y direction is given.

An MR head having such a configuration as in FIG. 16 can be produced, for example, in the following manner:

Initially, using a thin film-forming apparatus such as a sputtering apparatus, a lower shield layer 53 is formed on a slider 51 as a substrate. Using a thin film-forming apparatus such as a radio frequency magnetron sputtering apparatus and plural targets, a lower gap layer 54 is then formed on the layer 53 by sputtering, and onto the lower gap layer 54 are laminated a free magnetic layer 41, a nonmagnetic conductive layer 42, a pinned magnetic layer 43, and an antiferromagnetic layer 44 in this order to give a laminate.

The both sides of the formed laminate are eliminated with remaining a part corresponding to the track width (width of a magnetism-sensitive unit) by photolithography and ion-milling to form a GMR element layer 45 having a trapezoidal cross section; on both sides of the GMR element layer 45 are formed ferromagnetic layers 46, 46; and on each of the ferromagnetic layers 46, 46 are laminated a nonmagnetic conductive layer 47 and a lead layer 48 by sputtering while applying a magnetic field in a given direction.

Next, patterning is conducted to make the track width a given width by a photolithography process.

On the GMR element layer 45 and lead layer 48 is then formed an upper gap layer 56 having an Al—N—X system insulating layer by sputtering in a similar manner as above, and an upper shield layer 57 is then formed onto the gap layer 56 to give an objective MR head.

In this process, the Al—N—X system insulating layer in the gap layer should preferably be formed with heating the substrate, since such an insulating layer can contain the element X more than that obtained at a low substrate temperature such as room temperature, a gap layer having a higher thermal conductivity and corrosion resistance against an alkali solution and a lower membrane stress can be obtained. By way of illustration, when the substrate temperature in the formation of the gap layer is 100° C., the resultant insulating layer can contain Si as the element X up to about 20.4 atomic percent, and when it is 150° C., the layer can contain Si up to about 30 atomic percent, whereas when the substrate temperature is around room temperature, the layer can contain Si as the element X at most about 10.5 atomic percent. In the case where the substrate temperature is set to 100° C., the film is formed while adjusting the substrate temperature at 100° C. by heating the substrate by a heater provided in the film-forming chamber of the apparatus. For regulating the substrate temperature at room temperature, the film is formed while adjusting the substrate temperature at room temperature by supplying a cooling gas to the film-forming chamber in the radio frequency magnetron sputtering apparatus.

Upon the identical content of the element X in the gap layer, a gap layer formed at a high temperature of the substrate has a higher thermal conductivity and corrosion resistance against an alkali solution, and a lower membrane stress than that obtained at a low temperature of the substrate. By way of illustration, when a gap layer is formed at a substrate temperature of 100° C., it has a higher thermal conductivity and corrosion resistance against an alkali solution and a lower membrane stress than one formed at a substrate temperature of 25° C. and having the identical Si content as the element X. This is probably because a gap layer having a more satisfactory crystallinity of AlN, and hence a more satisfactory crystallinity of $Si_3N_4$ can be obtained when formed at a higher temperature of the substrate than that formed at a lower temperature of the substrate with the identical Si content.

The upper limit of the heating temperature of the substrate should be a temperature not deteriorating the performances of the resultant MR head. The temperature is preferably equal to or lower than 250° C., and more preferably from 20° C. to 150° C. When it exceeds 250° C., the GMR element layer 45 and hence its characteristics are deteriorated by heat, whereas when it is lower than 20° C., the crystallinity of AlN and $Si_3N_4$ is adversely affected.

In the magnetic head of the second embodiment, which is provided with the MR head h1 having a gap layer composed of an Al—N—X system insulating layer, the gap layer has a high corrosion resistance so as to avoid its dissolution in the formation of the MR head, and is problem-less in practical use. Accordingly, a reliable product can be provided without short circuit upon passing of a sensing current. In addition, the gap layer having the Al—N—X system insulating layer has a low membrane stress to avoid delamination in or after the formation of the MR head, and hence a reliable product can be obtained.

In addition, the gap layer having the Al—N—X system insulating layer has a high thermal conductivity and can efficiently dissipate heat generated through a sensing current even at an increasing stationary sensing current density. The magnetoresistive element layer can therefore be prevented from deterioration or cracking, migration or transmission of elements between individual constitutive layers of the magnetoresistive element layer can be blocked and defects such as deterioration of the GMR element characteristics can be avoided.

The magnetic head of the invention, therefore, can efficiently dissipate heat generated through a stationary sensing current from the gap layer, enhance the output of the magnetic head to apply a satisfactory and sufficient exchange anisotropic magnetic filed on a thin film, and obtain resistance changes having a satisfactory linear responsivity with excellent reading performances without generating Barkhausen noises.

Next, an illustrative configuration of the third embodiment of magnetic head of the invention will be described below.

Figure 17:
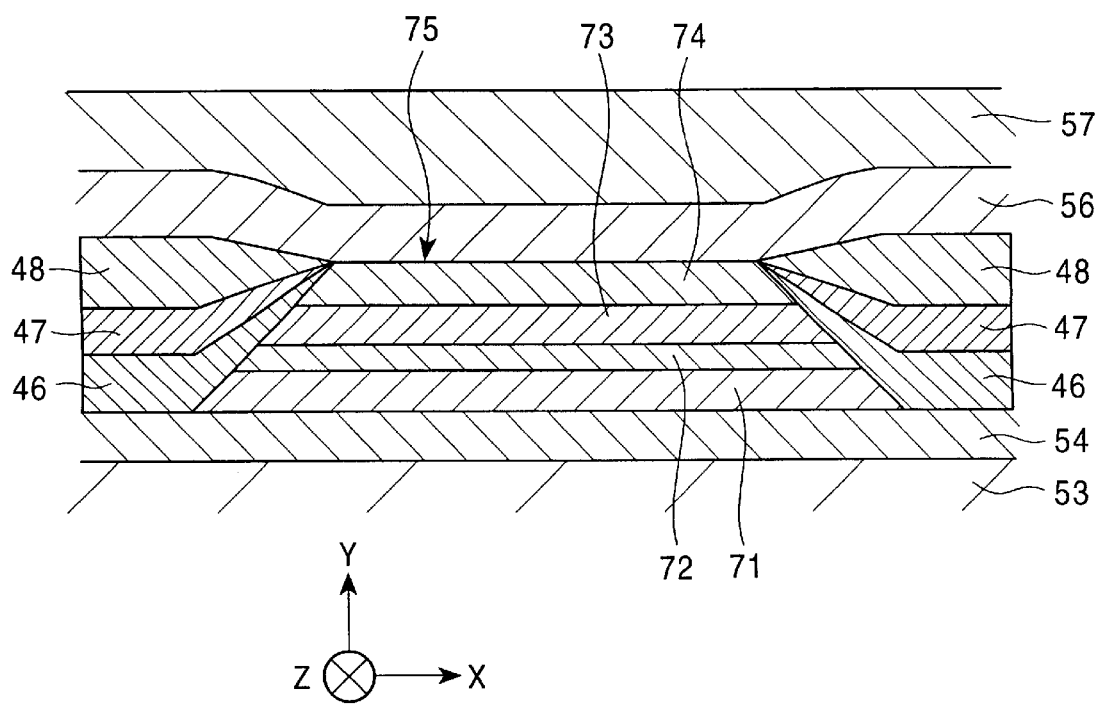
FIG. 17 is a sectional view illustrating the configuration of an MR head provided in a third embodiment of the thin film magnetic head according to the invention.

The magnetic head of the third embodiment differs from the magnetic head of the second embodiment in that the former uses an AMR element layer 75 as illustrated in FIG. 17 as the magnetoresistive element layer of the MR head h1.

The AMR element layer 75 is obtained by forming a soft magnetic layer 71 fabricated of, for example, a Ni—Fe—Nb alloy, a nonmagnetic conductive layer 72 fabricated of, for instance, Ta, a ferromagnetic layer (AMR material layer) 73 fabricated of, for example, a Ni—Fe alloy, and a protective layer 74 fabricated of, for instance, Ta, in this order.

For optimum operations of the MR head provided with the AMR element layer 75, both lateral and longitudinal bias magnetic fields are required with respect to the ferromagnetic layer 73 exhibiting the AMR effect.

The lateral bias magnetic field is to ensure resistance changes of the ferromagnetic layer 73 to respond linearly to a magnetic flux from a magnetic medium. This bias magnetic field is in the perpendicular direction to the plane of the magnetic medium (Z direction in FIG. 17) and in parallel with the plane of the ferromagnetic layer 73. The lateral bias magnetic field can be obtained by passing a sensing current from the lead layer 48 to the AMR element layer 75.

The longitudinal bias magnetic field is to suppress Barkhausen noises, i.e., to smooth resistance changes with respect to this flux from the magnetic medium with less noises and is applied in parallel with the planes of the magnetic medium and the ferromagnetic layer 73 (X direction in FIG. 17). The longitudinal bias magnetic field can be applied by utilizing a leakage flux from the ferromagnetic layers 46, 46 provided on both sides of the ferromagnetic layer 73, which put the ferromagnetic layer 73 into a single magnetic domain state to suppress Barkhausen noises.

The magnetic head of the third embodiment, which is provided with the MR head h1 comprising the gap layer having the Al—N—X system insulating layer, can provide similar operations and advantages to those of the magnetic head of the second embodiment mentioned above.

The magnetic heads of the aforementioned embodiments are described with taking the GMR element layer 45 or AMR element layer 75 as configured above as the magnetoresistive element layer, but the layer is not limited to these examples and can take other configurations.

EXAMPLE 2

Using a radio frequency magnetron sputtering apparatus, a 0.1-μm thick gap layer having an Al—N—Si system composition (Si content: 2 atomic percent in composition ratio) was formed on a Si substrate by sputtering to give a sample of 5 mm in width and 20 mm in length (Example 2). The obtained sample was then subjected to measurement of thermal conductivity, compressive stress, etching rate by a strong alkali solution and surface electrical resistance of the gap layer. The results are set force in Table 2 below.

The thermal conductivity herein was evaluated in the following manner: The gap layer of the MR head illustrated in FIG. 17 was composed of each of the materials indicated in Table 2, and a sensing current was passed through the MR head, and the resultant curve of temperature increase of the AMR element layer was approximated by the quadric, and the thermal conductivity was evaluated by the constant (constant "a") in the curve. The smaller the constant "a" is, the more satisfactory the thermal conductivity is. In Table 2, the term "Excellent" means that the constant "a" was equal to or less than 1.3, "Good" means that the constant "a" ranged from 1.3 to 2.2, and "Poor" means that the constant "a" was equal to or more than 2.2. The membrane stress herein was evaluated by a compressive stress determined from magnitude of changes of warping of the substrate before and after the formation, where the larger the compressive stress is, the more the membrane stress is. The etching rate was evaluated in the following manner: The gap layer side surface of the sample was covered with a tape, and the sample was immersed in a strong alkali solution (trade name AZ-400 K, manufactured by Hoechst Corporation, main component KOH) for 2 minutes, and the etching rate was calculated from the step formed on the sample taken out from the solution. A smaller etching rate means a higher corrosion resistance against a strong alkali solution. The surface electrical resistance was determined using an insulation-resistance meter.

Separately, a series of samples (Comparative Examples 1 and 2) were manufactured using aluminium oxide ($Al_2O_3$) and AlN respectively, and subjected to measurement of thermal conductivity, compressive stress, etching rate by a strong alkali solution and surface electrical resistance of the gap layers. The results are also shown in Table 2 below.

TABLE 2

| | Gap layer material | Thermal conductivity | Compressive stress (MPa) | Strong alkali etching rate (Å/min) | Surface electrical resistance (Ω) |
|---|---|---|---|---|---|
| Comp. ex. 1 | $Al_2O_3$ | Poor | 90 | 80 | $10^{12}$ |
| Comp. ex. 2 | AlN | Excellent | 2000 | 80 | $10^{10}$ |
| Example 2 | AlN + 2 at % Si | Good | 40 | 70 | $10^{11}$ |

Table 2 clearly demonstrates that the gap layer of Example 2 where Si was added to AlN in a composition ratio of 2 atomic percent had a higher thermal conductivity than the gap layer of Comparative Example 1 composed of aluminium oxide ($Al_2O_3$); and had a lower membrane stress and a lower etching rate and hence a higher corrosion resistance against a strong alkali solution than that of Comparative Example 1 and that of Comparative Example 2 composed of AlN. The gap layer of Example 2 had a practically applicable surface electrical resistance. Separately, the gap layers were subjected to measurement of corrosion resistance against water in the same manner as in the corrosion resistance against a strong alkali solution except that the samples were immersed in water. As a result, the gap layer of Example 2 had a higher corrosion resistance against water than the gap layers of Comparative Examples 1 and 2.

EXAMPLE 3

A series of samples were prepared in a similar manner to Example 2, except that the content of Si and the temperature of substrate ($T_s$) were respectively changed in the formation of Al—N—Si system gap layers. The substrate temperatures ($T_s$) were set at room temperature (25° C.), 100° C. and 150° C. respectively. To set and adjust the substrate temperature at room temperature, the film-formation was conducted while supplying a cooling gas to a film-forming chamber of a radio frequency magnetron sputtering apparatus To set and adjust the substrate temperature at 100° C., the film-formation was carried out while heating the substrate by a heater in the film-forming chamber of the radio frequency magnetron sputtering apparatus. To set and adjust the substrate temperature at 150° C., the substrate was heated by a heater in the film-formation in a similar manner to that at 100° C.

Figure 18:
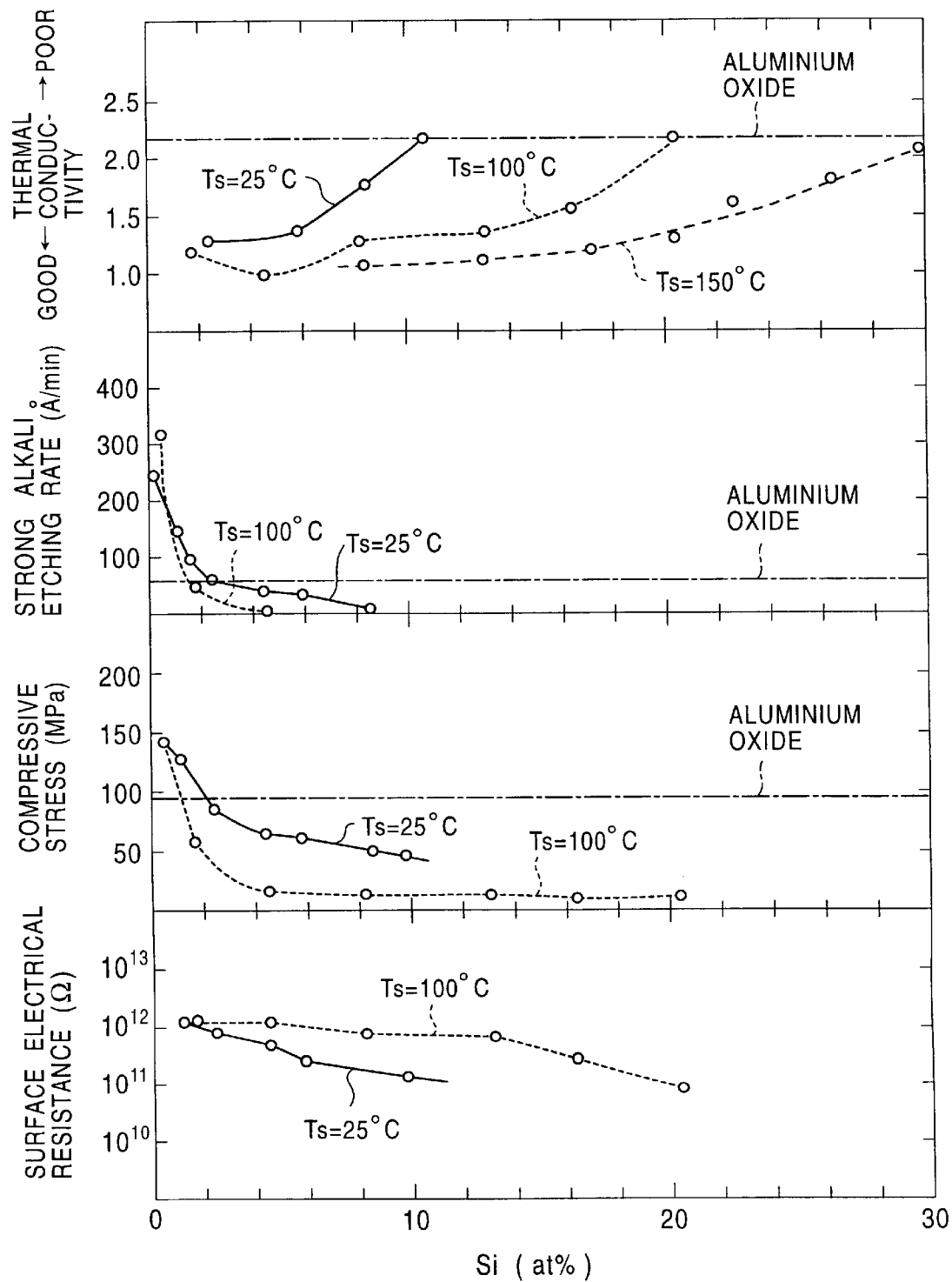
FIG. 18 is a graph of the dependencies on Si content in the gap layer of the thermal conductivity, corrosion resistance, membrane stress and surface electrical resistance of the gap layer.

The prepared samples were then subjected to measurement of the thermal conductivity, compressive stress, etching rate by a strong alkali solution, and surface resistance of the gap layers in the same manner as in Example 2. The results are set forth in FIG. 18 and Tables 3–5. FIG. 18 is a graph illustrating the dependencies on Si content in the gap layer of the thermal conductivity, corrosion resistance, membrane stress and surface electrical resistance of the gap layer. The solid line in FIG. 18 indicates data at a substrate temperature ($T_s$) of 25° C., and the broken lines indicate data at substrate temperatures ($T_s$) of 100° C. and 150° C., respectively. Tables 3, 4 and 5 respectively demonstrate data at substrate temperatures ($T_s$) of 25° C., 100° C. and 150° C.

The single dash & dot line in FIG. 18 indicates the thermal conductivity, corrosion resistance and membrane stress of a gap layer composed of aluminium oxide ($Al_2O_3$) as comparison.

TABLE 3

$T_s = 25°$ C.

| Si content (at %) | Constant a | Strong alkali etching rate (Å/min) | Compressive stress (MPa) | Surface electrical resistance (Ω) |
|---|---|---|---|---|
| 0.3 | — | 250 | — | — |
| 0.5 | — | — | 140 | — |
| 1.0 | — | 150 | 125 | — |
| 1.5 | — | 100 | — | — |
| 2.3 | 1.3 | 65 | 80 | $9 \times 10^{11}$ |
| 4.3 | — | 50 | 60 | $7 \times 10^{11}$ |
| 5.7 | 1.4 | 40 | 55 | $2 \times 10^{11}$ |
| 8.4 | 1.8 | 20 | 45 | $1.5 \times 10^{11}$ |
| 9.7 | — | — | 40 | $1.3 \times 10^{11}$ |
| 10.5 | 2.2 | — | — | — |

TABLE 4

$T_s = 100°$ C.

| Si content (at %) | Constant a | Strong alkali etching rate (Å/min) | Compressive stress (MPa) | Surface electrical resistance (Ω) |
|---|---|---|---|---|
| 0.4 | — | 320 | 140 | — |
| 1.6 | 1.2 | 50 | 50 | $1 \times 10^{12}$ |
| 4.4 | 1.0 | 10 | 15 | $1.5 \times 10^{12}$ |
| 8.1 | 1.3 | 10 | 10 | $7 \times 10^{11}$ |
| 13.0 | 1.4 | — | 10 | $6.5 \times 10^{11}$ |
| 16.3 | 1.6 | — | 5 | $3 \times 10^{11}$ |
| 20.4 | 2.2 | — | 10 | $8 \times 10^{10}$ |

TABLE 5

$T_s = 150°$ C.

| Si content (at %) | Constant a |
|---|---|
| 9.0 | 1.1 |
| 12.1 | 1.1 |
| 16.4 | 1.2 |
| 20.0 | 1.2 |
| 22.4 | 1.6 |
| 26.3 | 1.8 |
| 29.5 | 2.1 |

Figure 19:
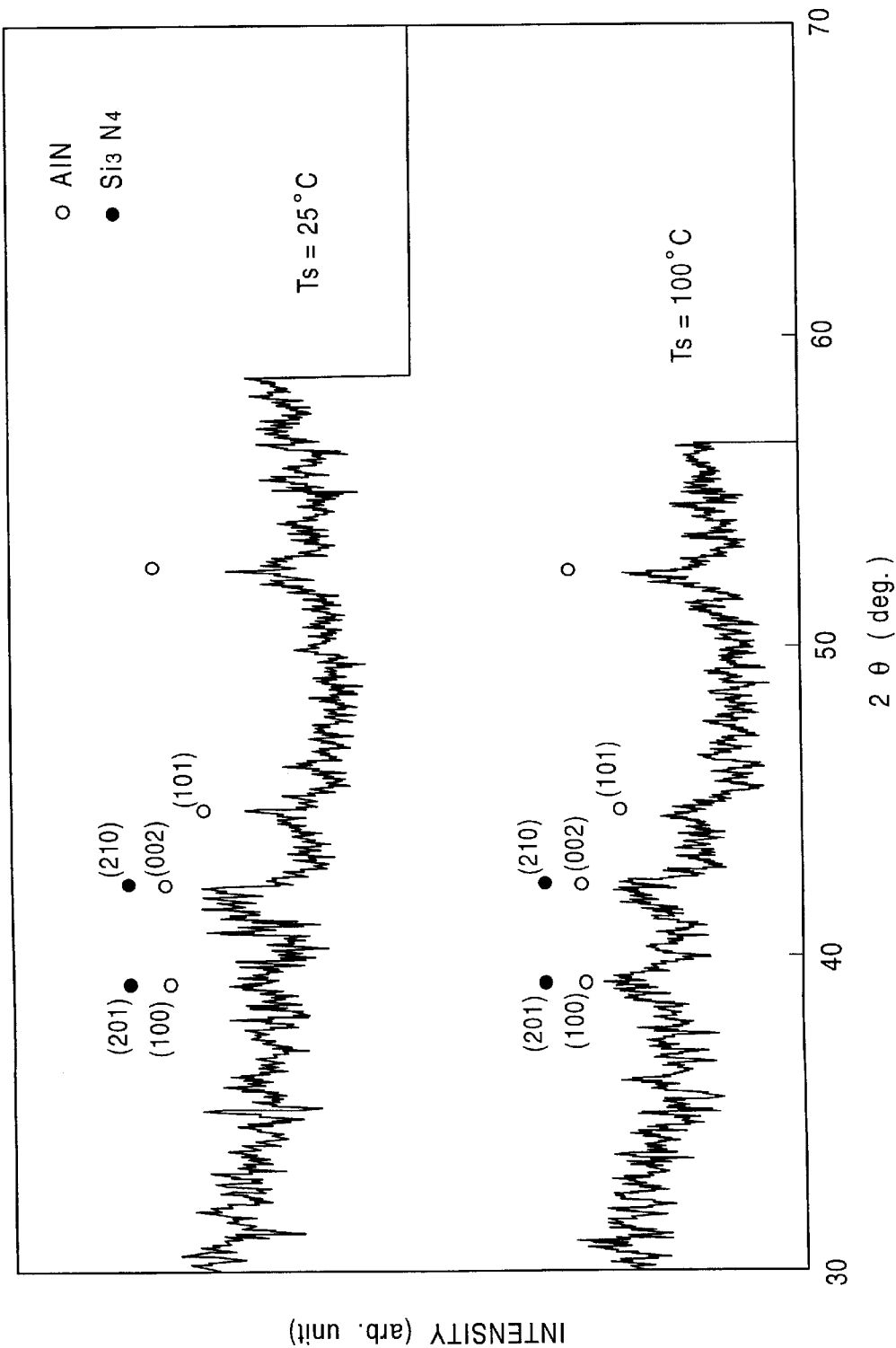
FIG. 19 is a diagram of X-ray diffraction patterns of samples obtained by forming an Al—N—Si system gap layer respectively on a substrate with a temperature of 25° C. and one with a temperature of 100° C.

FIG. 19 illustrates X-ray diffraction patterns of samples respectively obtained by forming an Al—N—Si system gap layer on substrates at temperatures of 25° C. and 100° C., where an open circle indicates peak of AlN, and a closed circle indicates peak of $Si_3N_4$. The Si content in the gap layer was 4.0 atomic percent for each substrate temperature.

FIG. 18 and tables 3–5 demonstrate that when an Al—N—Si system gap layer is formed on a substrate of 25° C. in temperature, a gap layer having a higher thermal conductivity and a higher corrosion resistance and a lower membrane stress than aluminium oxide ($Al_2O_3$) can be obtained, whose surface electrical resistance is applicable in practice, by regulating the Si content within the range from 2.0 to 10.5 atomic percent. They also demonstrate that, more preferably, a gap layer having much a higher thermal conductivity and corrosion resistance against an alkali solution and a lower membrane stress than aluminium oxide ($Al_2O_3$)

can be obtained by controlling the Si content within the range from 2.0 to 6.0 atomic percent.

These figure and tables also demonstrate that when an Al—N—Si system gap layer is formed on a substrate of 100° C. in temperature, a gap layer having a higher thermal conductivity and a higher corrosion resistance and a lower membrane stress than aluminium oxide ($Al_2O_3$) can be obtained, whose surface electrical resistance is applicable in practice, by regulating the Si content within the range from 2.0 to 20.4 atomic percent (at %). The Si content should more preferably be controlled in the range from 2.0 to 14.0 atomic percent to give a gap layer having much a higher thermal conductivity, a higher corrosion resistance against an alkali solution and a lower membrane stress.

When an Al—N—Si system gap layer is formed on a substrate of 150° C. in temperature, a gap layer having a higher thermal conductivity than aluminium oxide ($Al_2O_3$) can be obtained by regulating the Si content within the range from 9.0 to 29.5 atomic percent.

These results demonstrate that when a gap layer is fabricated of Al—N—Si system, a gap layer having a higher thermal conductivity and a higher corrosion resistance and a lower membrane stress than aluminium oxide ($Al_2O_3$) can be obtained, whose surface electrical resistance is applicable in practice, by adjusting the Si content within the range from 2 atomic percent to 30.0 atomic percent.

FIG. 19 demonstrates that the addition of Si as the element X into an Al—N system gap layer results in peaks specific for a hexagonal crystal AlN in the (100) plane, (002) plane and (101) plane, and peaks specific for a hexagonal crystal $Si_3N_4$ in the (201) plane and (210) plane; and that larger peaks in the (100) plane and (002) plane of AlN and a higher crystallinity of AlN can be obtained at a substrate temperature of 100° C. than at a substrate temperature of 25° C. in the formation of the gap layer.

As apparent from FIG. 18 and Tables 3–5, more Si can be contained in the gap layer at a substrate temperature of 100° C. or 150° C. in the formation of the gap layer than at a substrate temperature of 25° C. When the Si contents are identical, a higher thermal conductivity and a higher corrosion resistance against an alkali solution and a lower membrane stress of the gap layer can be obtained at a substrate temperature of 100° C. or 150° C. than at 25° C. This is provably because larger peaks of the (100) plane and (002) plane of AlN, a higher crystallinity of AlN and hence a higher crystallinity of $Si_3N_4$ can be obtained at a substrate temperature of 100° C., i.e., a higher temperature, than at a substrate temperature of 25° C. in the formation of the gap layer.

They also demonstrate that a lower surface electrical resistance was obtained at a substrate temperature of 25° C. than at a substrate temperature of 100° C.

Separately, corrosion resistance against water was examined in a similar manner in the corrosion resistance test against a strong alkali solution as above, on a series of Al—N—Si system gap layers having Si contents of 2.0 to 10.5 atomic percent formed on a substrate of 25° C. in temperature, on those having Si contents ranging from 2.0 to 20.4 atomic percent formed on a substrate of 100° C. in temperature, and on those having Si contents ranging from 2.0 to 29.5 atomic percent formed on a substrate of 150° C. in temperature. As a result, these gap layers had a high corrosion resistance against water.

EXAMPLE 4

A lower gap layer (Al—N—Si system, Si content 2.0 atomic percent) of 1000 angstroms in thickness was formed on a Si substrate by sputtering with the use of a radio frequency magnetron sputtering apparatus and plural targets.

On the lower gap layer were formed, by sputtering, a soft magnetic layer (Ni—Fe—Nb alloy film), a nonmagnetic conductive layer (Ta film), a ferromagnetic layer (Ni—Fe alloy film) and a protective layer (Ta film) in this order to give a laminate.

Both side edges of the obtained laminate were removed with remaining a part corresponding to the track width (width of a magnetism-sensitive unit) by a photolithography process and ion-milling to give an AMR element layer; ferromagnetic layers (Co—Pt alloy) of 300 angstroms in thickness were formed on both sides of the AMR element layer; a nonmagnetic conductive layer (Ta) of 50 angstroms in thickness and a lead layer (Cr) of 1200 angstroms in thickness were laminated on each of the ferromagnetic layers by sputtering; and in this lamination, a magnetic field of 200 Oe was applied at an angle of 90° with respect to the above applied magnetic field.

The product was finally patterned to have a track width of 2 $\mu$m by the photolithography process to give an AMR element sample (Example).

Figure 20:
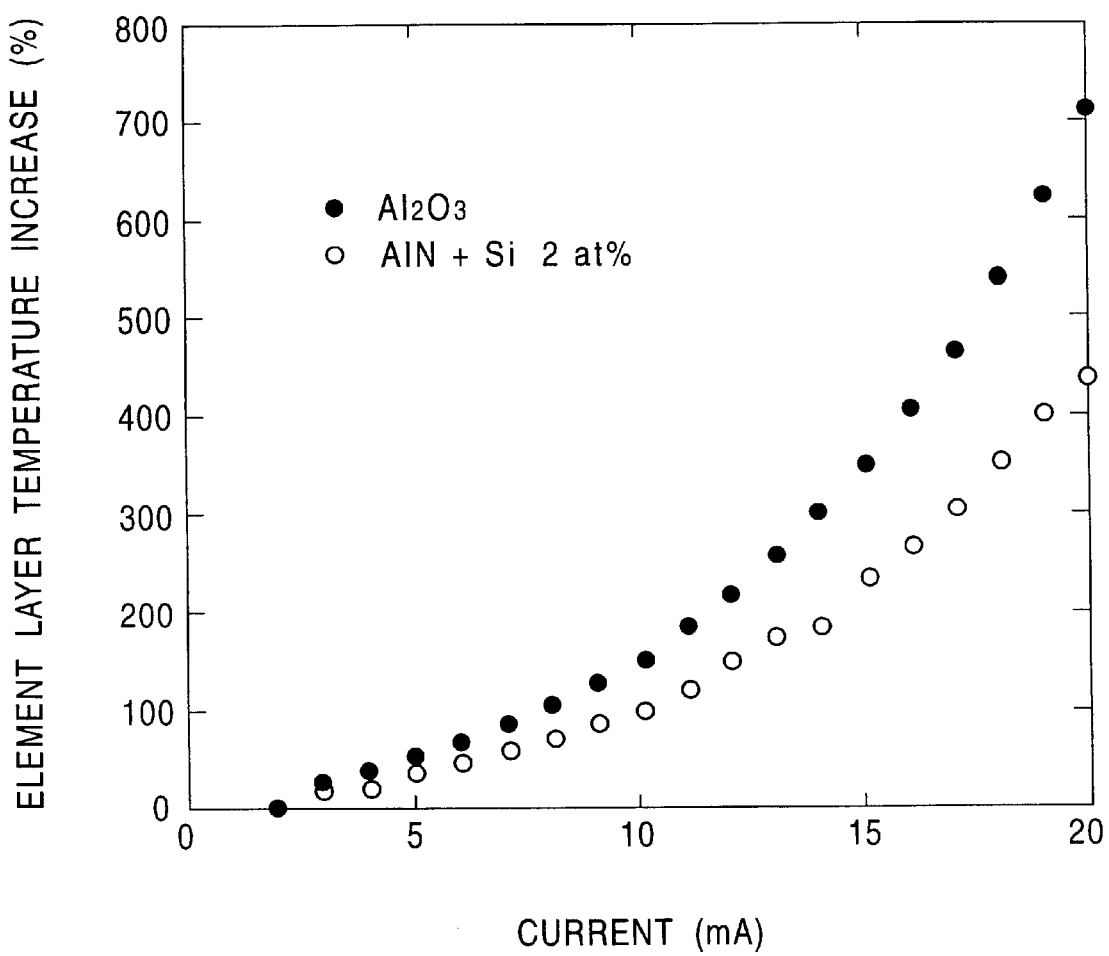
FIG. 20 is a graph of the relationship between a stationary sensing current passed in the MR head and the temperature increase rate (%) of an AMR element layer.
Figure 21:
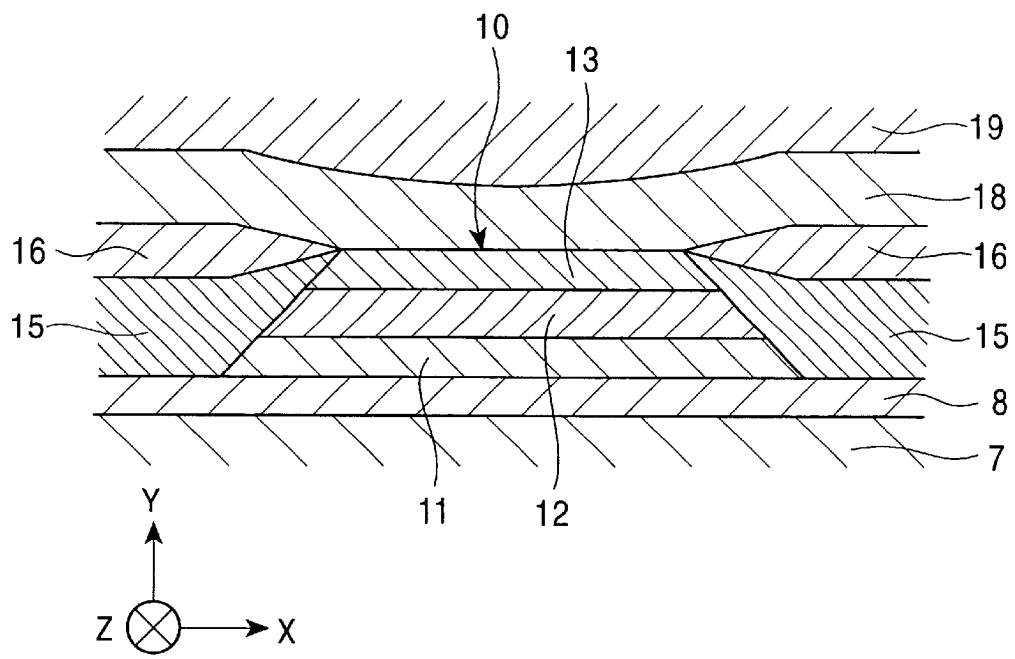
FIG. 21 is a sectional view of an illustrative configuration of a conventional AMR head.
Figure 22:
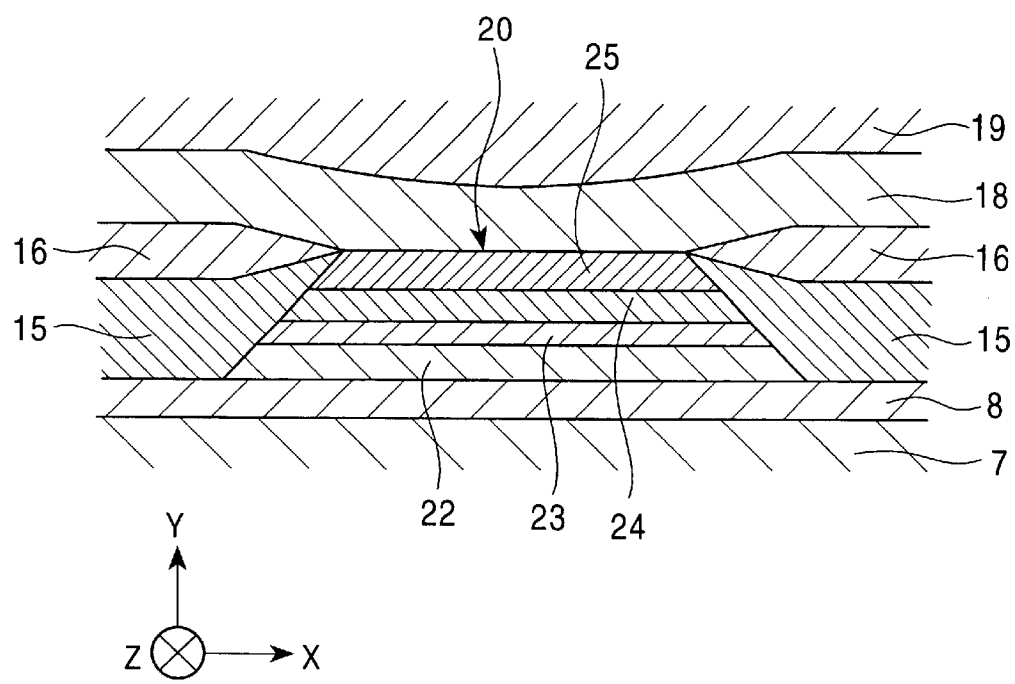
FIG. 22 is a sectional view of an illustrative configuration of a conventional GMR head.

The AMR element sample was then subjected to measurement of increase (%) of the AMR element layer temperature when a sensing current passing through the AMR element sample was changed. The results are shown in FIG. 20. The AMR element layer temperature was measured in the following manner: The relationship between the temperature and resistance was beforehand examined by putting an AMR element was put in an oven while a constant sensing current (2 mA) passing therethrough, and raising the temperature. Separately, the relationship between the current and resistance was determined increasing a current passing through an AMR head provided with the AMR element sample of Example at a temperature of 20° C.; the temperature of the AMR element layer was determined through the resistance obtained in the latter step according to the relationship between the temperature and resistance previously examined (i.e., the temperature was determined through the resistance as a medium).

As a comparative example, an AMR element sample was prepared in the same manner as in Example above, except that the gap layer was fabricated of $Al_2O_3$. The increase (%) of the AMR element layer temperature was determined when a stationary sensing current passing through an AMR head provided with the AMR element sample of the comparative example was changed. The results are also shown in FIG. 20.

FIG. 20 demonstrates that the AMR element sample having the lower gap layer composed of an Al—N—Si system insulating layer (Si content 2.0 atomic percent) is lower in the temperature increase of the AMR element layer with an increasing sensing current than the AMR element of the comparative example having the lower gap layer of $Al_2O_3$, indicating that the former can dissipate heat generated through a sensing current with a higher efficiency.

As described above, the thin film magnetic head according to this embodiment of the invention, which gap layer has an Al—N—X system insulating layer, wherein the element X is at least one element selected from the group consisting of Si, B, Cr, Ti, Ta and Nb, can dissipate heat generated through a stationary sensing current so as to improve the output of the magnetic head and to apply a sufficient exchange anisotropic magnetic field on a thin film. In addition it can provide resistance changes excellent in linear responsivity without generating Barkhausen noises and provide satisfactory reading performances. The gap layer having an Al—N—X system insulating layer is excellent in corrosion resistance against a strong alkali solution and water and has a low membrane stress so that it will not be delaminated in or after the formation of an MR head and hence can provide a reliable product.

In the process for producing a thin film magnetic head of the invention, for depositing crystallized thin films in turn on a substrate having a magnetoresistive element layer disposed in a film-forming chamber capable of vacuum-exhaustible to form a gap layer having an Al—N—X system insulating layer, wherein the element X is at least one element selected from the group consisting of Si, B, Cr, Ti, Ta and Nb, the insulating layer is formed while heating the substrate. In this case, the gap layer can have an insulating layer containing more element X, have a higher thermal conductivity and higher corrosion resistance against an alkali solution and a lower membrane stress than that formed without heating the substrate. When the contents of the element X in the gap layers are identical, a gap layer formed at a higher substrate temperature can have a higher crystallinity of AlN and hence a higher crystallinity of crystals of X and N, and therefore it can have higher thermal conductivity and corrosion resistance against an alkali solution and a lower membrane stress than that formed at a lower substrate temperature.

What is claimed is:

1. A thin film magnetic head being composed of at least a lower shield layer, a lower gap layer formed on the lower shield layer, a magnetoresistive element layer formed on the lower gap layer, a lead layer for imparting a sensing current to the magnetoresistive element layer, said lead layer being formed on both sides of the magnetoresistive element layer, an upper gap layer formed on the lead layer, and an upper shield layer formed on the upper gap layer, wherein the lower gap layer comprises an Al—N—X insulating layer, the element X being at least one element selected from the group consisting of Si, B, Cr, Ti, Ta and Nb, and wherein said insulating layer contains the element X in a composition ratio of 2.0 to 30.0 atomic percent.

2. The thin film magnetic head according to claim 1, wherein said insulating layer contains AlN crystals and $Si_3N_4$ crystals.

3. The thin film magnetic head according to claim 2, wherein said AlN crystals are hexagonal, the (100) plane, the (002) plane, and the (101) plane thereof being detected by X-ray diffraction.

4. The thin film magnetic head according to claim 2, wherein said $Si_3N_4$ crystals are hexagonal, the (201) plane and the (210) plane thereof being detected by X-ray diffraction.

5. The thin film magnetic head according to claim 2, wherein said AlN crystals are hexagonal, the (100) plane, the (002) plane, and the (101) plane thereof being detected by X-ray diffraction, and wherein said $Si_3N_4$ crystals are hexagonal, the (201) plane and the (210) plane thereof being detected by X-ray diffraction.

6. The thin film magnetic head being composed of at least a lower shield layer, a lower gap layer formed on the lower shield layer, a magnetoresistive element layer formed on the lower gap layer, a lead layer for imparting a sensing current to the magnetoresistive element layer, said lead layer being formed on both sides of the magnetoresistive element layer, an upper gap layer formed on the lead layer, and an upper shield layer formed on the upper gap layer, wherein the upper gap layer comprises an Al—N—X insulating layer, the element X being at least one element selected from the group consisting of Si, B, Cr, Ti, Ta and Nb, and wherein said insulating layer contains the element X in a composition ratio of 2.0 to 30.0 atomic percent.

7. The thin film magnetic head according to claim 6, wherein said insulating layer contains AlN crystals and $Si_3N_4$ crystals.

8. The thin film magnetic head according to claim 7, wherein said AlN crystals are hexagonal, the (100) plane, the (002) plane, and the (101) plane thereof being detected by X-ray diffraction.

9. The thin film magnetic head according to claim 7, wherein said $Si_3N_4$ crystals are hexagonal, the (201) plane and the (210) plane thereof being detected by X-ray diffraction.

10. The thin film magnetic head according to claim 7, wherein said AlN crystals are hexagonal, the (100) plane, the (002) plane, and the (101) plane thereof being detected by X-ray diffraction, and wherein said $Si_3N_4$ crystals are hexagonal, the (201) plane and the (210) plane thereof being detected by X-ray diffraction.

11. A thin film magnetic head being composed of at least a lower shield layer, a lower gap layer formed on said lower shield layer, a magnetoresistive element layer formed on said lower gap layer, a lead layer for imparting a sensing current to said magnetoresistive element layer, said lead layer being formed on both sides of the magnetoresistive element layer, an upper gap layer formed on said lead layer, and an upper shield layer formed on said upper gap layer, wherein said lower gap layer is comprised of an AlN film having a mean crystal grain size ranging from 85 angstroms to 130 angstroms, and wherein the (002) plane of a crystalline layer of said AlN film is in preferred orientation in the direction perpendicular to the film plane.

12. The thin film magnetic head according to claim 11, wherein said mean crystal grain size ranges from 95 angstroms to 130 angstroms.

13. The thin film magnetic head being composed of at least a lower shield layer, a lower gap layer formed on said lower shield layer, a magnetoresistive element layer formed on said lower gap layer, a lead layer for imparting a sensing current to said magnetoresistive element layer, said lead layer being formed on both sides of the magnetoresistive element layer, an upper gap layer formed on said lead layer, and an upper shield layer formed on said upper gap layer, wherein said upper gap is comprised of an AlN film having a mean crystal grain size ranging from 85 angstroms to 130 angstroms, and wherein the (002) plane of a crystalline layer of said AlN film is in preferred orientation in the direction perpendicular to the film plane.

14. The thin film magnetic head according to claim 13, wherein said mean crystal grain size ranges from 95 angstroms to 130 angstroms.

15. A thin film magnetic head being composed of at least a lower shield layer, a lower gap layer formed on said lower shield layer, a magnetoresistive element layer formed on said lower gap layer, a lead layer for imparting a sensing current to said magnetoresistive element layer, said lead layer being formed on both sides of the magnetoresistive element layer, an upper gap layer formed on said lead layer, and an upper shield layer formed on said upper gap layer, wherein said lower gap layer is comprised of an AlN film having a lattice parameter ranging from 2.67 angstroms to 2.7 angstroms, and wherein the (002) plane of a crystalline layer of said AlN film is in preferred orientation in the direction perpendicular to the film plane.

16. The thin film magnetic head according to claim 15, wherein said lattice parameter ranges from 2.68 angstroms to 2.7 angstroms.

17. The thin film magnetic head being composed of at least a lower shield layer, a lower gap layer formed on said lower shield layer, a magnetoresistive element layer formed on said lower gap layer, a lead layer for imparting a sensing current to said magnetoresistive element layer, said lead layer being formed on both sides of the magnetoresistive element layer, an upper gap layer formed on said lead layer, and an upper shield layer formed on said upper gap layer, wherein said upper gap layer is comprised of an AlN film having a lattice parameter ranging from 2.67 angstroms to 2.7 angstroms, and wherein the (002) plane of a crystalline layer of said AlN film is in preferred orientation in the direction perpendicular to the film plane.

18. The thin film magnetic head according to claim 17, wherein said lattice parameter ranges from 2.68 angstroms to 2.7 angstroms.

* * * * *